US010982589B1

(12) United States Patent
Mendoza et al.

(10) Patent No.: US 10,982,589 B1
(45) Date of Patent: Apr. 20, 2021

(54) METHODS AND SYSTEMS FOR A CHARGE AIR COOLER

(71) Applicant: Transportation IP Holdings, LLC, Norwalk, CT (US)

(72) Inventors: Michael Mendoza, Fredonia, PA (US); Dan Cullen, Greenfield Center, NY (US); Ganesasubramanian Murugesan, Bangalore (IN); Akshay Kotecha, Grove City, PA (US); Sandeep Kanzal Venkatesha, Bangalore (IN); Kamala Hasan Pethuraj, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/688,880

(22) Filed: Nov. 19, 2019

(51) Int. Cl.
*F02B 29/04* (2006.01)
*F01D 25/28* (2006.01)
*F02B 67/00* (2006.01)

(52) U.S. Cl.
CPC .......... *F02B 29/0425* (2013.01); *F01D 25/28* (2013.01); *F02B 67/00* (2013.01); *F02B 29/0412* (2013.01)

(58) Field of Classification Search
CPC .. F02B 29/0425; F02B 67/00; F02B 29/0412; F01D 25/28
See application file for complete search history.

(56) References Cited

U.S. PATENT DOCUMENTS

| | | | |
|---|---|---|---|
| 10,202,030 B2 * | 2/2019 | Yokoi | B60K 6/22 |
| 2007/0251234 A1 * | 11/2007 | Liu | F02B 29/0412 60/605.2 |
| 2016/0090902 A1 * | 3/2016 | Svihla | F02B 37/004 105/62.1 |

* cited by examiner

*Primary Examiner* — Brandon D Lee
(74) *Attorney, Agent, or Firm* — McCoy Russell LLP

(57) ABSTRACT

Various systems are provided for a charge-air cooler system. In one example, a system includes a turbocharger system having at least one compressor and one turbine and configured to provide charge air to an engine. The system also includes a charge-air cooler system having at least one charge-air cooler arranged below the at least one compressor, a turbocharger bracket arranged directly below the charge-air cooler system and shaped to mount the charge-air cooler and the turbocharger system to the engine, and a stator adapter physically coupling an alternator to the engine. The stator adapter includes an accessibility window arranged below the charge-air cooler system. The at least one charge-air cooler is closer to the accessibility window than the turbocharger system.

20 Claims, 10 Drawing Sheets

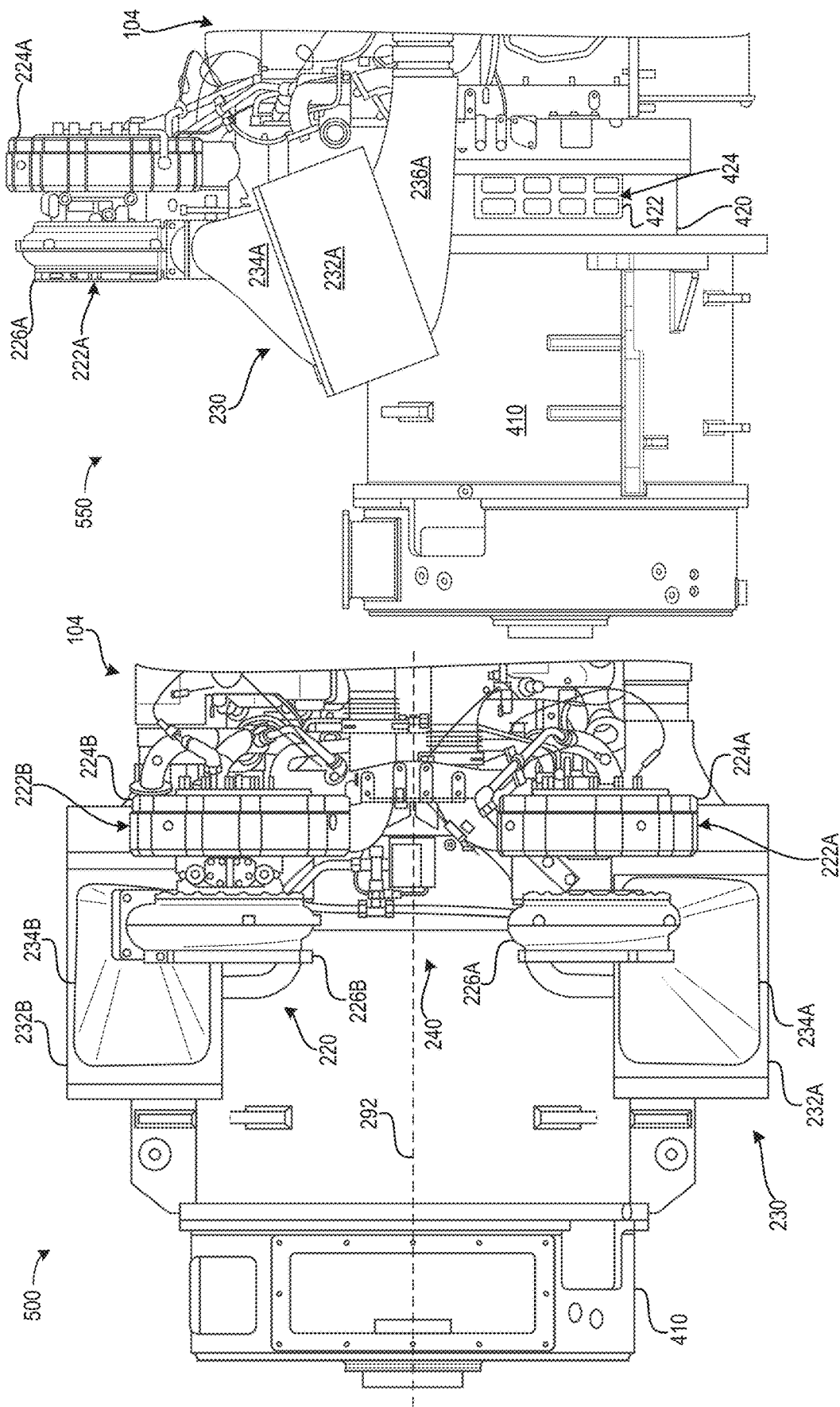

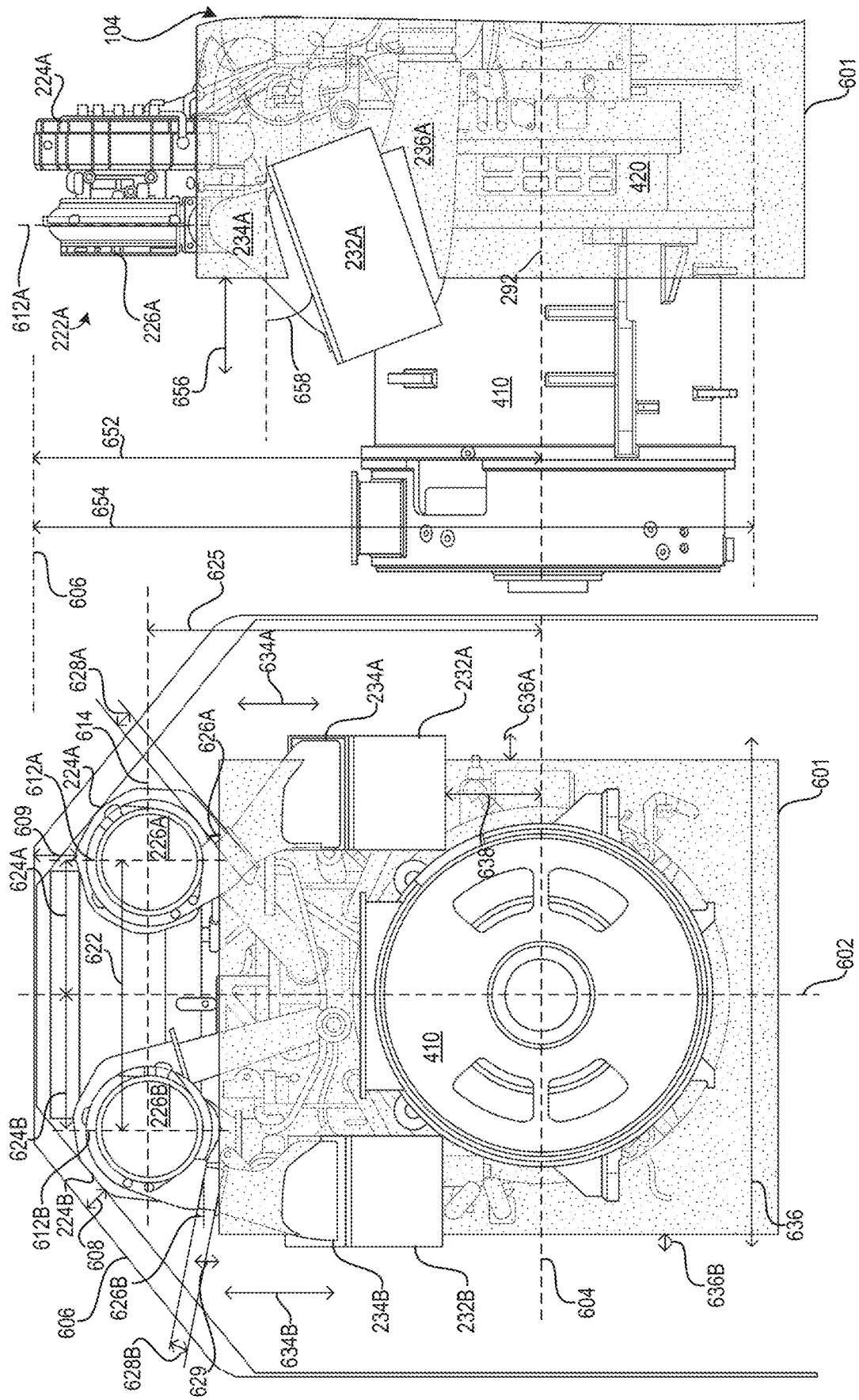

METHODS AND SYSTEMS FOR A CHARGE AIR COOLER

TECHNICAL FIELD

Embodiments of the subject matter disclosed herein relate to charge-air cooler for an engine system.

DISCUSSION OF ART

Engines may be equipped with compressors, as part of a turbocharging or supercharging system, which may provide a greater amount of air mass to each cylinder during a combustion cycle. Thus, power output of an engine may increase while a swept volume may remain unchanged. Alternatively, if the swept volume is decreased, it may be possible to adjust a current load to a higher load, which may result in decreased fuel consumption.

A charge-air cooler (CAC) may be additionally arranged in the turbocharging or supercharging system. The CAC may be arranged downstream of the compressor and may cool compressed air flowing therethrough. Compression by cooling may take place, which may allow the turbocharging or supercharging system to flow increasingly dense charge air to the engine relative to a non-cooled charge-air flow.

BRIEF DESCRIPTION

In one embodiment, a system includes a turbocharger system, a charge-air cooler system, a turbocharger bracket, and a stator adapter. The turbocharger system is configured to provide charge air to an engine, and includes at least one compressor and one turbine. The charge-air cooler system includes at least one charge-air cooler arranged below the at least one compressor. The turbocharger bracket is arranged directly below the charge-air cooler system and shaped to mount the charge-air cooler and the turbocharger system to the engine. The stator adapter physically couples an alternator to the engine, and includes an accessibility window arranged below the charge-air cooler system. The at least one charge-air cooler is closer to the accessibility window than the turbocharger system.

BRIEF DESCRIPTION OF THE DRAWINGS

FIGS. 5A and 5B show top-down and side-on views, respectively, of the first embodiment of the engine comprising the alternator, the stator, and the CAC system.

FIGS. 6A and 6B show face-on and side-on views, respectively, of the first embodiment the engine comprising the alternator, stator, and CAC system in a housing.

FIGS. 2-8B are shown approximately to scale.

DETAILED DESCRIPTION

The following description relates to embodiments of a charge-air cooler. In one embodiment, a system includes a turbocharger system shaped to provide charge air to an engine, the turbocharger system comprising at least one compressor and one turbine, a charge-air cooler system comprising at least one charge-air cooler arranged below the at least one compressor, a turbocharger bracket arranged directly below the charge-air cooler system shaped to mount the charge-air cooler and the turbocharger system to the engine, and a stator adapter physically coupling an alternator to the engine, and where the stator adapter comprises an accessibility window arranged below the charge-air cooler system, and where the at least one charge-air cooler is closer to the accessibility window than the turbocharger system. Herein, closer may be used to compare shortest distances between a common location and two different components, wherein the closer component comprises a shortest distance less than a shortest distance of the farther component. The charge-air cooler may comprise a single charge-air cooler or two charge-air cooler arranged mounted to the engine via a turbocharger bracket. The orientation of the compressors may adjust one or more of an angle and/or position of the charge-air cooler(s) such that access to the accessibility window may be maintained.

Figure 1:
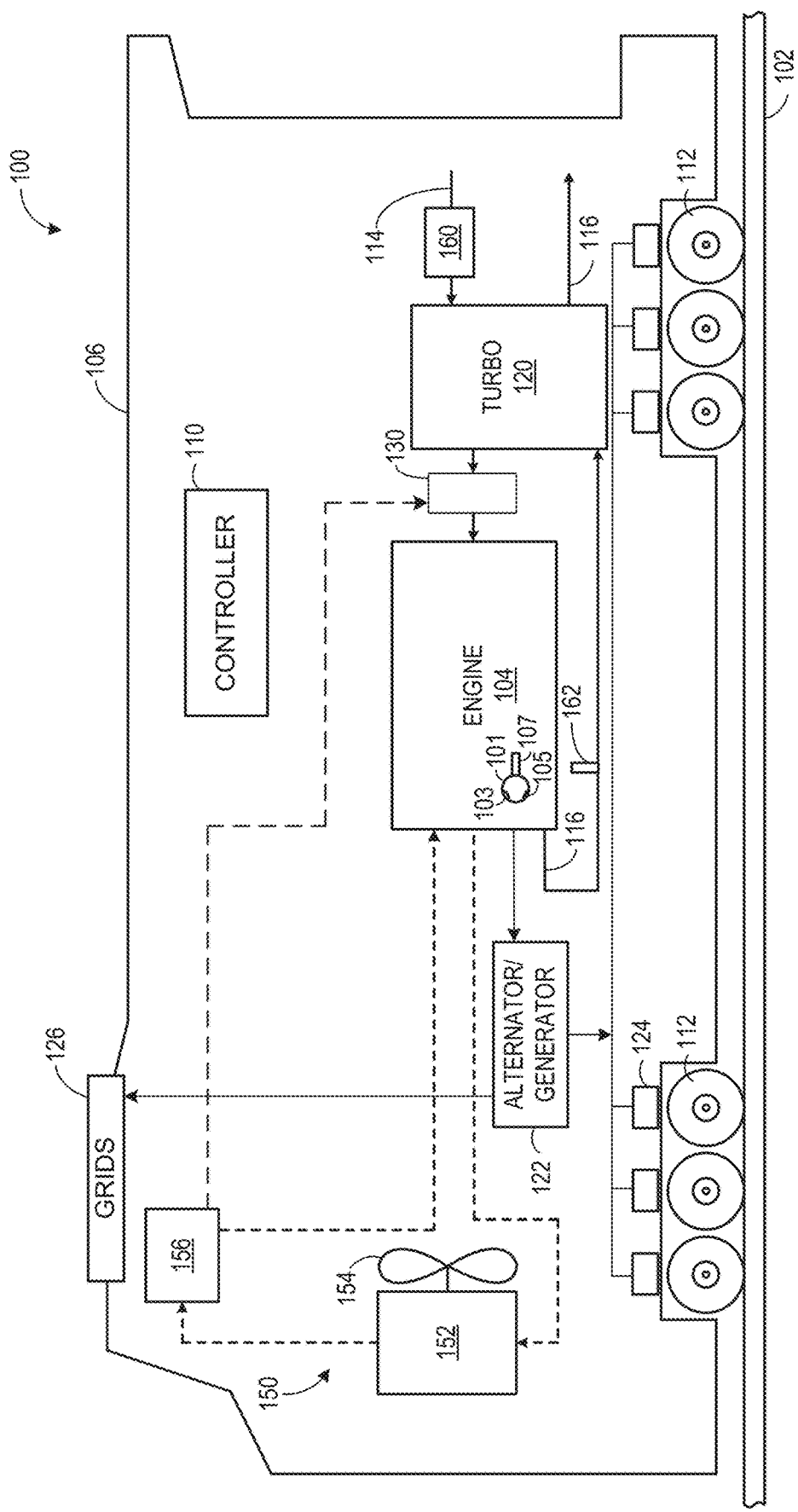
FIG. 1 shows a schematic diagram of a vehicle with an engine comprising a charge-air cooler (CAC) system, according to an embodiment of the present disclosure.
Figure 2:
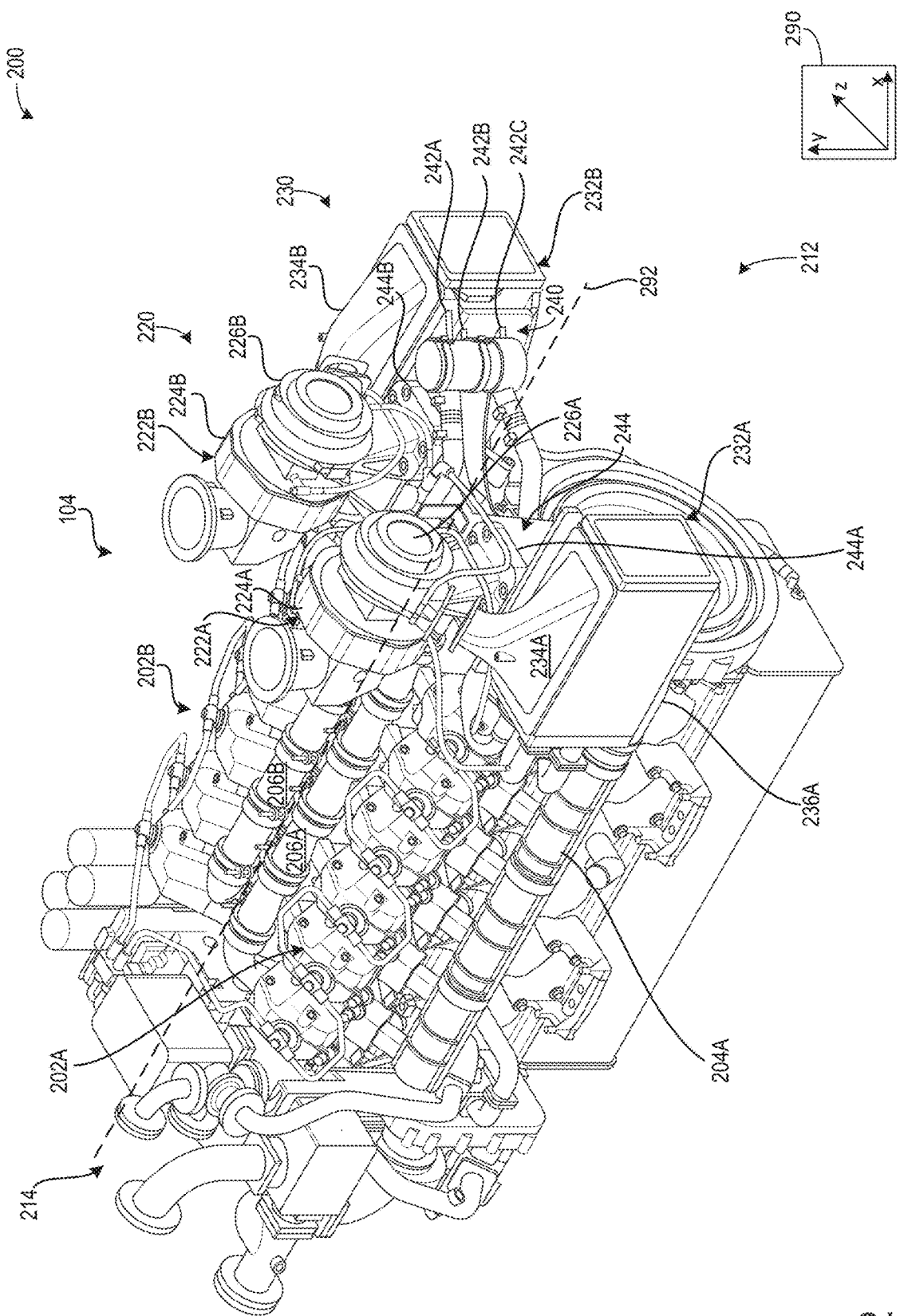
FIGS. 2 and 3 show an engine comprising a first embodiment of a charge-air cooler (CAC) system.
Figure 3:
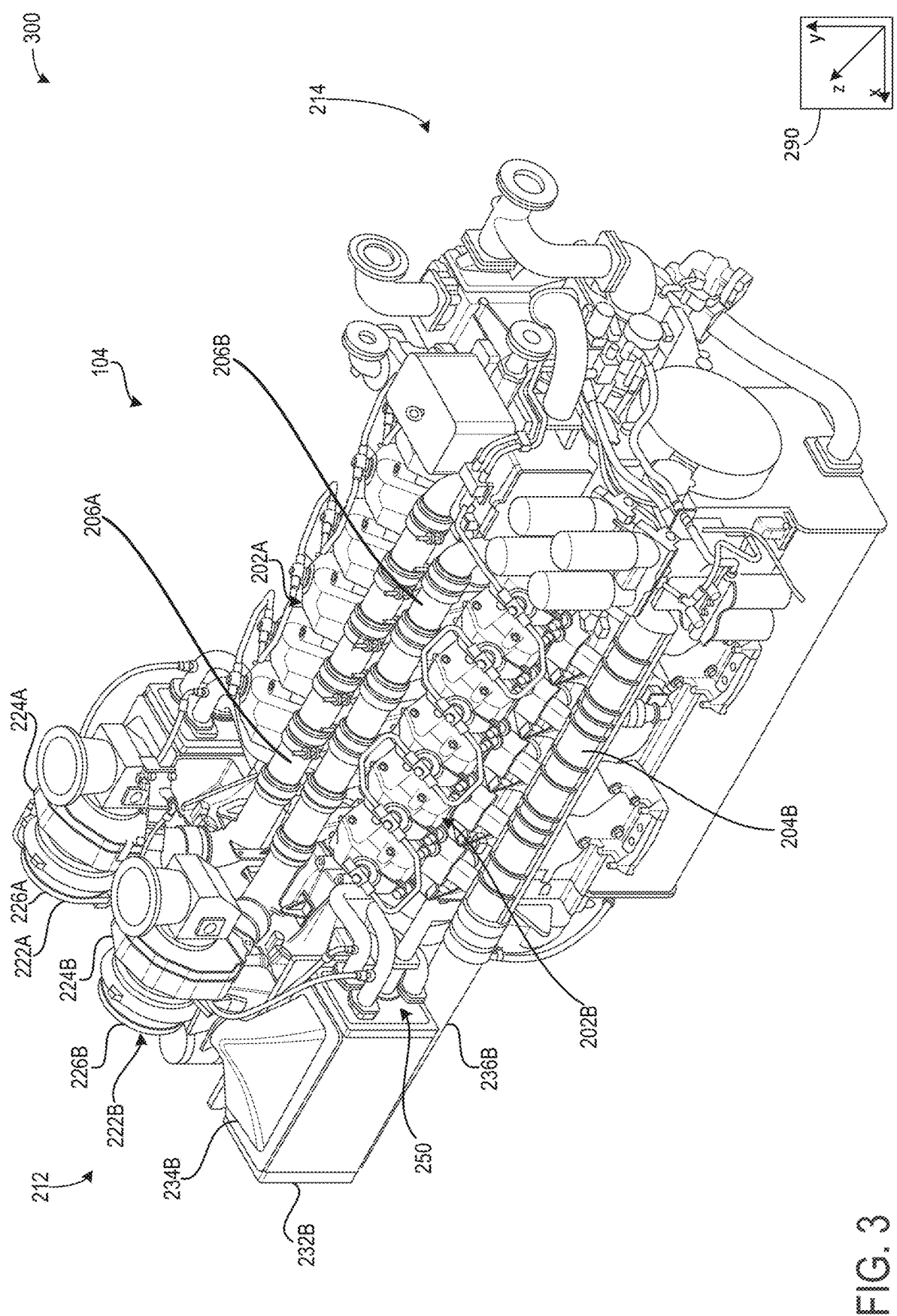
Figure 7A:
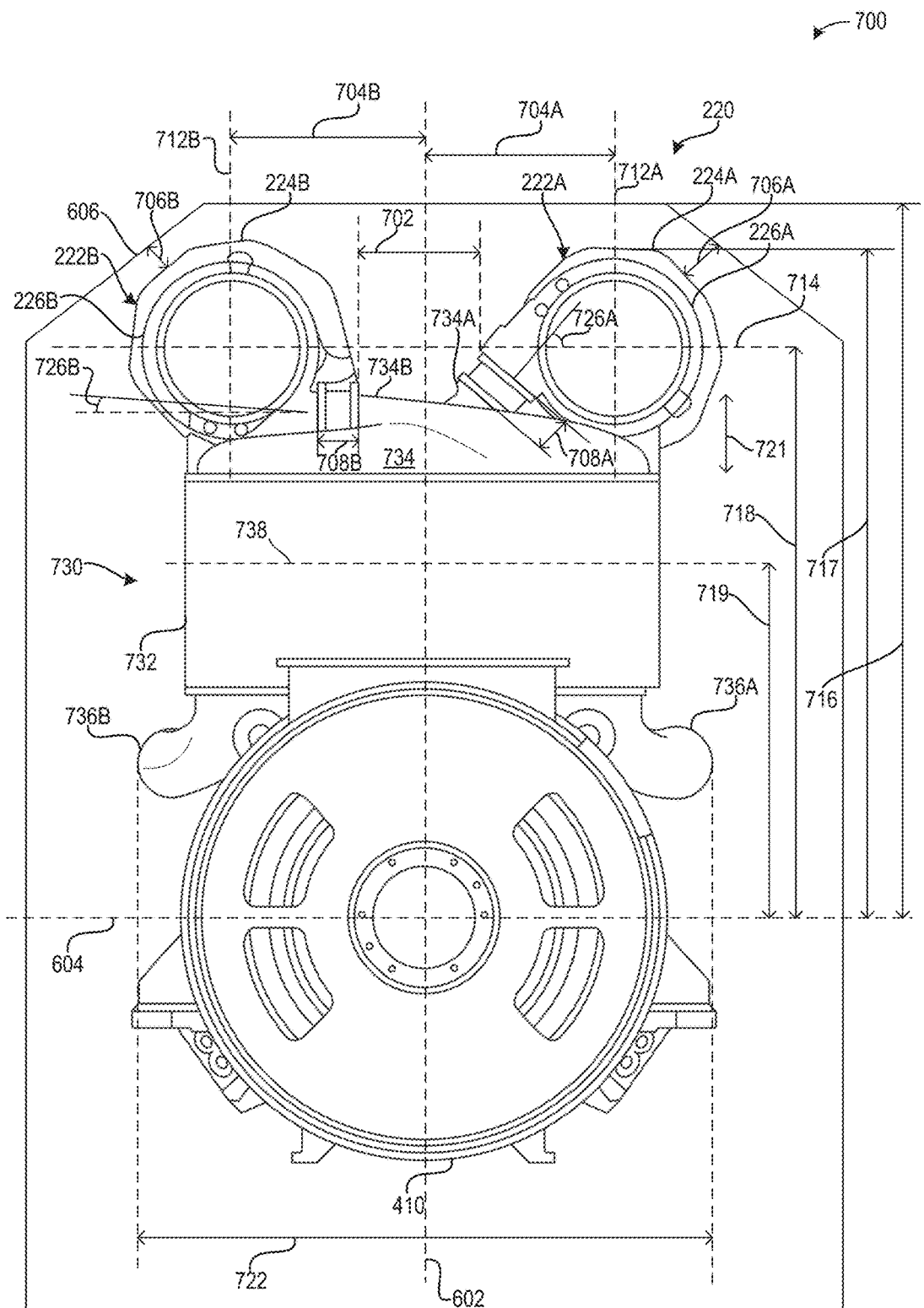
FIG. 7A shows a face-on view of the engine comprising the alternator and a second embodiment of a CAC system.
Figure 7B:
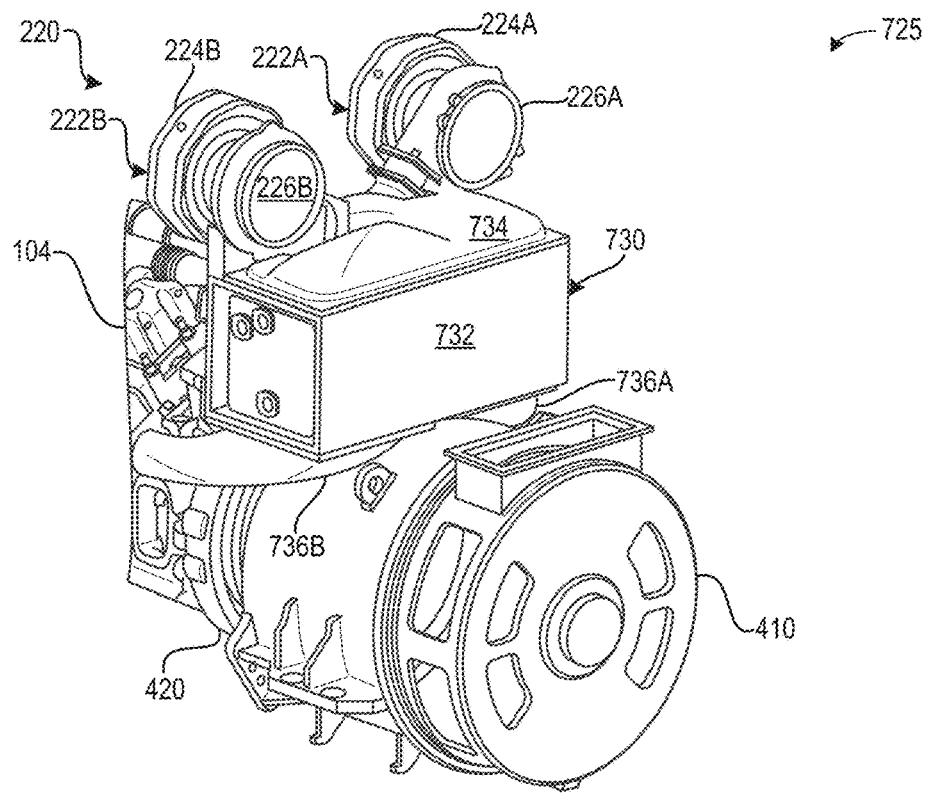
FIG. 7B shows a perspective view of the engine comprising the alternator, the stator, and the second embodiment of the CAC system.
Figure 7C:
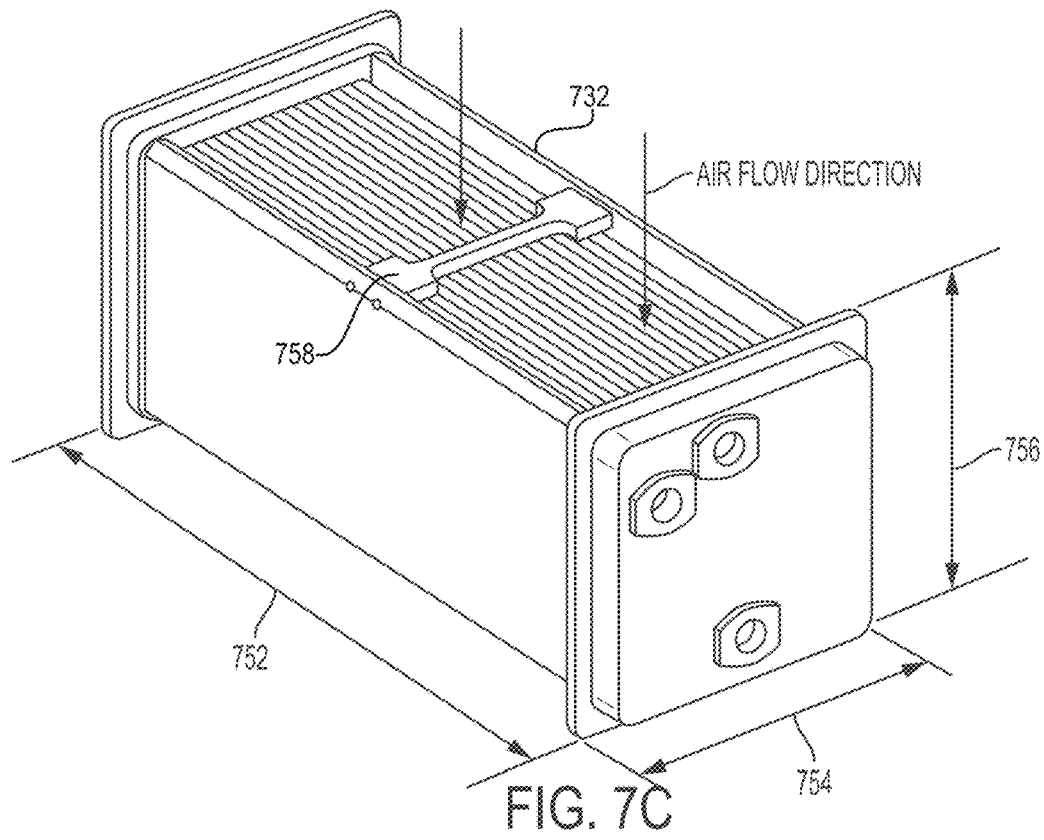
FIG. 7C shows a view of the second embodiment of the second embodiment of the CAC system.
Figure 7D:
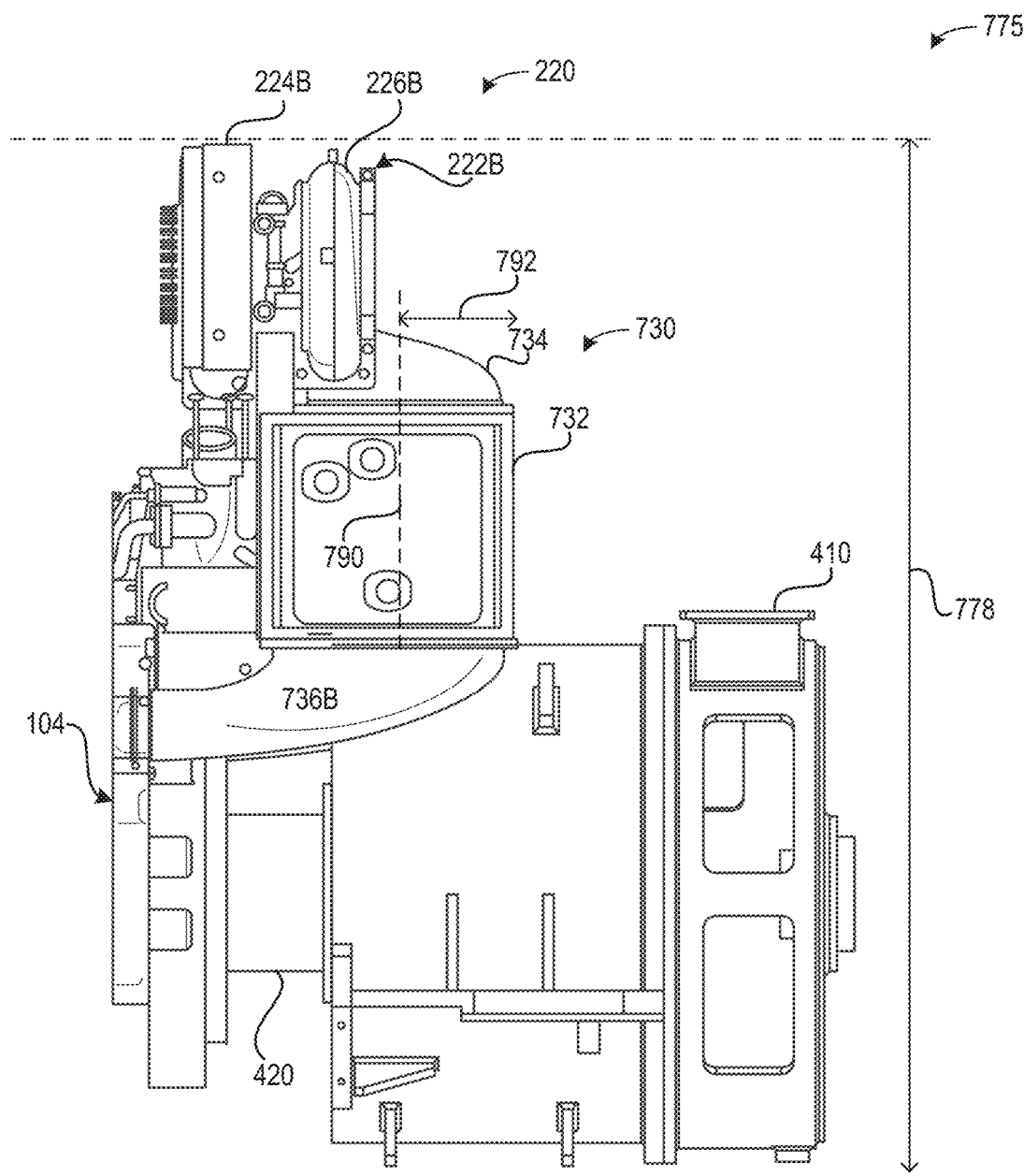
FIG. 7D shows a side-on view of the engine comprising the alternator and the second embodiment of the CAC system.

FIG. 1 shows an example system in which a charge-air cooler system may be installed. As an example, charge-air from a turbocharger and/or supercharger system may travel to an inlet of a charge-air cooler of the charge-air cooler system and flow through the cooler to cool the charge-air, thereby increasing its density before flowing to the engine. A first embodiment of the charge-air cooler system is shown in FIGS. 2 and 3. The first embodiment of the charge-air cooler comprises at least two charge-air coolers, each shaped to cool charge-air flow therethrough. The charge-air coolers may be mounted on a support, shown in FIGS. 2 and 8A and 8B. Further details of the first embodiment of the charge-air cooler system are shown in FIGS. 5A, 5B, 6A, and 6B. A second embodiment of the charge-air cooler system is shown in FIG. 7A. The second embodiment of the charge-air cooler system may comprise a single charge-air cooler shaped to cool charge-air flowing therethrough. Additional details of the second embodiment of the charge-air cooler system are shown in FIGS. 7B, 7C, and 7D. The engine further comprises an alternator and a stator near which one of the first embodiment or second embodiment of the charge-air cooler system may be arranged. The alternator and the stator may comprise a window through which an operator may access internal components of the alternator and/or stator. The first and second embodiments of the charge-air cooler system may be arranged relative to the alternator and the stator to permit access through the window without disassembly.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the disclosure.

FIGS. 2-7D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 shows an embodiment of a system in which a charge-air cooler system may be installed. Specifically, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle 106 includes an engine 104. The engine includes a plurality of cylinders 101 (only one representative cylinder shown in FIG. 1) that each include at least one intake valve 103, exhaust valve 105, and fuel injector 107. Each intake valve, exhaust valve, and fuel injector may include an actuator that may be actuated via a signal from a controller 110 of the engine 104. In other non-limiting embodiments, the engine 104 may be a stationary engine, such as in a power-plant application, or an engine in a marine vessel or other off-highway vehicle propulsion system as noted above.

The engine receives intake air for combustion from an intake passage 114. The intake passage comprises an air filter 160 that filters air from outside of the rail vehicle. Exhaust gas resulting from combustion in the engine is supplied to an exhaust passage 116. Exhaust gas flows through the exhaust passage, and out of an exhaust stack of the rail vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels other than diesel and natural gas.

The alternator/generator 122 produces electrical power that may be stored and applied for subsequent propagation to a variety of downstream electrical components. As an example, the alternator/generator 122 may be electrically coupled to a plurality of traction motors and the alternator/generator may provide electrical power to the plurality of traction motors. As depicted, each of the plurality of traction motors is connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include at least one compressor (not shown) which is at least partially driven by at least one corresponding turbine (not shown). Further, a charge-air cooler system 130 may be present between the compressor of the turbocharger or supercharger and intake manifold of the engine. The charge-air cooler system 130 may comprise one or more charge-air coolers shaped to cool the compressed air to further increase the density of the charge air. The charge-air cooler system 130 may be a water-based intercooler or an air-based intercooler.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or exhaust aftertreatment systems.

As depicted in FIG. 1, the vehicle system further includes a cooling system 150 (e.g., engine cooling system). The cooling system circulates coolant through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller. Coolant which is cooled by the radiator may enter a tank (not shown). The coolant may then be pumped by a water, or coolant, pump 156 back to the engine or to another component of the vehicle system, such as the charge-air cooler system 130.

As shown in FIG. 1, a coolant/water passage from the pump splits in order to pump coolant (e.g., water) to both the charge-air cooler system 130 and engine 104 in parallel. As described further below with reference to FIGS. 2-7D, the charge-air cooler system 130 may comprise one or more charge-air coolers. The charge-air cooler system 130 may further include turbocharger mounts and may be shaped to couple to V12 and V16 variants of the engine 104.

The controller 110 may be configured to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the engine and/or rail vehicle, may be configured to receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, gas and coolant temperatures in the charge-air cooler of the charge-air cooler system 130, or the like. Additional sensors, such as coolant temperature sensors, may be positioned in the cooling system and/or within the charge-air cooler. Correspondingly, the controller may control the engine and/or the rail vehicle by sending commands to various components such as the traction motors, the alternator/generator, fuel injectors, valves (e.g., coolant and/or EGR cooler valve), coolant pump, or the like. For example, the controller may control the operation of a restrictive element (e.g., such as a valve) in the engine cooling system. Other actuators may be coupled to various locations in the rail vehicle.

FIG. 2 shows a front-to-back view 200 of a first embodiment of a charge-air cooler system 230. The charge-air cooler system 230 may be used similarly to charge-air cooler system 130. FIG. 3 shows a back-to-front view 300 of the first embodiment of the charge-air cooler system 230. FIGS. 2 and 3 may be described in tandem herein. Engine 104 is included in the examples of FIGS. 2 and 3. As such, components previously introduced may be similarly numbered in subsequent figures.

An axis system 290 is shown comprising three axes, namely an x-axis parallel to a horizontal direction, a y-axis parallel to a vertical direction, and a z-axis perpendicular to each of the x- and y-axes. A central axis 292 of the engine 104 is shown via a dashed line.

The engine 104 comprises a first cylinder group 202A and a second cylinder group 202B, wherein the first cylinder group 202A and the second cylinder group 202B may comprise an equal number of cylinders. In some examples, the first and second cylinder groups 202A, 202B may comprise six cylinders each, and the 12 cylinders of the first and second cylinder groups 202A, 202B may be arranged in a V-configuration relative to the central axis 292. Thus, engine 104 may be configured as a V-12. It will be appreciated by those of ordinary skill in the art that the description of the charge-air cooler system 230 and other associated components may be arranged in engine configurations other than a V-configuration, including inline, box, and rotary configurations having different numbers of cylinders including 2, 4, 6, 8, and so on. In one example, the components described in further detail herein may be shaped to accommodate only V-12 and V-16 configurations of the engine 104.

A turbocharging system 220 may be adjacent to a rear side 212 of the engine 104. The turbocharging system 220 may be used similarly to turbocharger 120 of FIG. 1. Additionally or alternatively, turbocharging system 220 may comprise two or more turbochargers, wherein at least one of the turbochargers may be used similarly to the turbocharger 120 of FIG. 1. In the examples of FIGS. 2 and 3, the turbocharging system 220 comprises a first turbocharger 222A and a second turbocharger 222B. Each of the first and second turbochargers 222A, 222B may comprise a turbine mechanically coupled to a compressor on a shared rod or shaft. More specifically, the first turbocharger 222A comprises a first turbine 224A mechanically coupled to a first compressor 226A within a shared turbocharger housing. The second turbocharger 222B comprises a second turbine 224B mechanically coupled to a second compressor 226B within a shared turbocharger housing.

The first turbocharger 222A may be arranged to receive exhaust gases from the first cylinder group 202A by flowing exhaust gases through a first exhaust passage 206A to the first turbine 224A. The first turbocharger 222A may be arranged to flow boost air to the first cylinder group 202A via the first compressor 226A. The second turbocharger 222B may be arranged to receive exhaust gases from the second cylinder group 202B by flowing exhaust gases through a second exhaust passage 206B to the second turbine 224B. The second turbocharger may be arranged to flow boost air to the second cylinder group 202B via the second compressor 226B. The first and second turbines 224A, 224B may be shaped to rotate upon receiving exhaust gases, wherein rotational energy of the turbines may be shared with the first and second compressors 226A, 226B, respectively, resulting in intake air compression and the generation of boost air.

The turbocharging system 220 may be mounted near a rear side 212 of the engine 104, opposite of a front side 214, via a turbocharger bracket 240 and a turbocharger pedestal 244. In some examples, the read side 212 may face and/or be adjacent to a rear-most portion of a propulsion apparatus (e.g., a train, car, boat, airplane, etc.). The turbocharger bracket 240 may comprise a bridge-shape. Additionally or alternatively, the turbocharger bracket 240 may comprise a member having a half-moon shape, U-shape, C-shape, and the like. In one example, the turbocharger bracket 240 is shaped similarly to a rectangle and/or square with a half-circle cutout therefrom. The turbocharger bracket 240 may comprise a plurality of brackets, wherein each of the brackets may be similarly or differently shaped. At any rate, the turbocharger bracket 240 may be shaped to provide a threshold clearance to fit a direct-coupled rail propulsion alternator while supporting the turbocharger system 230 sized for a 12 cylinder or more engine and the charge-air cooler system 230.

Figure 8A:
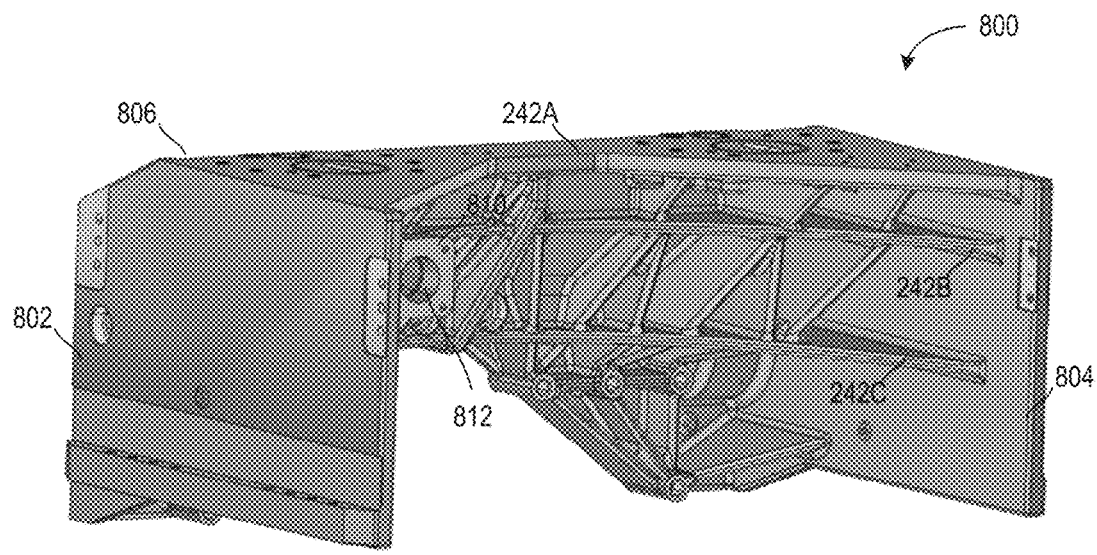
FIGS. 8A and 8B show additional perspective views of a support of the charge-air cooler system.
Figure 8B:
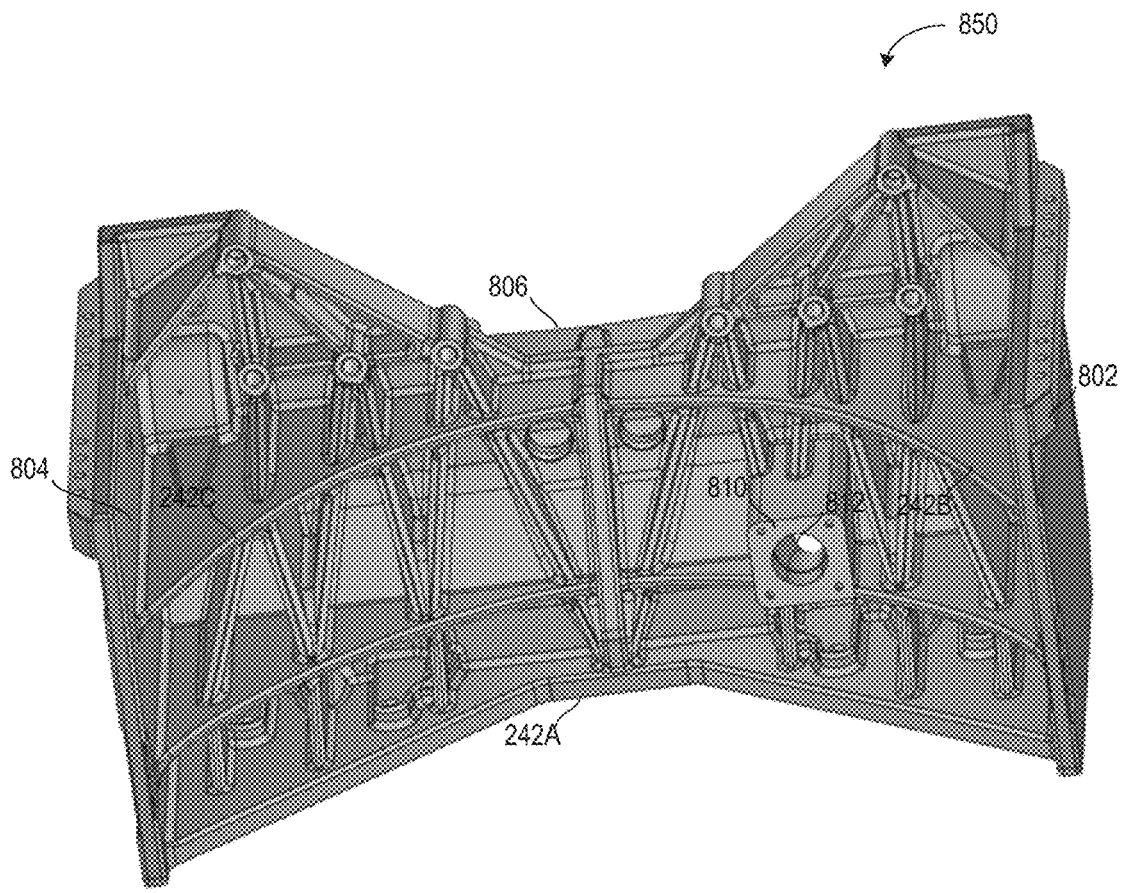

In the example of FIG. 2, and as shown in greater detail with respect to FIGS. 8A and 8B, the turbocharger bracket 240 comprises three brackets, including a first bracket 242A, a second bracket 242B, and a third bracket 242C arranged in that order in a negative direction along the y-axis. The turbocharger bracket 240 may further comprise a back panel, to which each of the first 242A, second 242B, and third 242C brackets are physically coupled. In one example, the turbocharger bracket 240, including the back panel and the first 242A, second 242B, and third 242C brackets may be a single, contiguous piece. Additionally or alternatively, the brackets may be separate from the back panel. For example, the back panel may comprise one or more cutouts for the brackets to be press fit therein.

The turbocharger pedestal 244 may be shaped to mount various turbochargers to the turbocharger bracket 240. More specifically, the turbocharger pedestal 244 may be physically coupled to the first bracket 242A of the turbocharger bracket 240 via one or more of a weld, a fastener, an adhesive, and a fusion. A number of turbocharger pedestals may be equal to a number of turbochargers. In the example of FIGS. 2 and 3, there are exactly two turbochargers, each of the turbochargers being mounted onto a first turbocharger pedestal 244A and a second turbocharger pedestal 244B. The first and second turbocharger pedestals 244A, 244B may be arranged on opposite sides of the central axis 292, biasing each of the first and second turbochargers 222A, 222B to the first and second cylinder groups 202A, 202B, respectively.

Turning now to FIGS. 8A and 8B, they show perspective views 800 and 850, respectively of the turbocharger bracket 240. More specifically, the perspective view 800 illustrates a view of the first 242A, second 242B, and third 242C turbocharger brackets. The turbocharger bracket 240 comprises a first side 802 opposite a second side 804, each of the first and second sides 802, 804 are physically coupled to a back wall 806. The back wall 806 may be in face-sharing contact with a portion of the engine (e.g., engine 104 of FIG. 2), wherein the portion is a back side of the engine. The first bracket 242A may represent a top side of the turbocharger bracket 240, wherein the first bracket 242A may be physically coupled to upper extreme ends of the first side 802, second side 804, and back wall 806. In one example, the first bracket 242A may be a portion of the turbocharger bracket 240 which may come into direct, face-sharing contact with turbocharger pedestal 244. As such, the first bracket 242A may directly support the charge-air cooler system 230 and turbocharger system 220.

Perspective view 850 illustrates an underside view of the turbocharger bracket 240. Therein, a shape of the second and third brackets 242B, 242C are illustrated in full. As shown, the second and third brackets 242B, 242C comprise an arc-shape and extend from the first and second sides 802, 804 and are physically coupled to the back wall 806 along their entire lengths. The second and third brackets 242B, 242C may provide additional support to the charge-air cooler system 230 and the turbocharger system 220 indirectly. Each of the first 242A, second 242B, and third 242C brackets may be physically coupled to each of the first side 802, second side 804, and back side 806 via one or more of welds, fusions, adhesives, and fasteners. In one example, only the back side 806 may be in direct physical contact with the engine. Furthermore, only the first bracket 242A may be in direct physical contact with the turbocharger pedestal 244.

Additionally or alternatively, the first 242A, second 242B, and third 242C brackets may be sized such that the first bracket 242A is larger than the second bracket 242B, which is larger than the third bracket 242C. In one example, the first 242A, second 242B, and third 242C brackets may be shaped identically with different dimensions.

As shown in each of FIGS. 8A and 8B, the turbocharger bracket 240 may further comprise a protrusion 810 comprising a passage 812 extending therethrough. In some examples, the passage 812 may be fluidly coupled to one or more passages of the engine. In one example, the passage 812 may be used to vent and/or direct one or more fluids from inside the engine to an area outside the engine.

Returning to FIG. 2, the turbocharger bracket 240 may be further shaped to mount the charge-air cooler system 230, which includes mounting each of a first charge-air cooler 232A and a second charge-air cooler 232B to the rear side 212 of the engine 104. The first charge-air cooler 232A and the second charge-air cooler 232B may be substantially identical. The turbocharger bracket 240 may extend between and be fixedly coupled to each of the first and second charge-air coolers 232A, 232B. Couplings between the turbocharger bracket 240 and each of the turbocharger system 220 and the charge-air cooling system 230 may include one or more of welds, adhesives, fasteners, and fusions.

The first charge-air cooler 232A may be arranged to receive boost air from the first compressor 226A and flow cooled boost air to the first cylinder group 202A via a first intake passage 204A. The second charge-air cooler 232B may be arranged to receive boost air from the second turbine 224B and flow cooled boost air to the second cylinder group 202B via a second intake passage 204B. The first and second intake passages 204A, 204B may be substantially parallel to the central axis 292 and may be arranged below the first and second charge-air coolers 232A, 232B.

The first charge-air cooler 232A may be fluidly coupled to an outlet of the first compressor 226A of the first turbocharger 222A via a first charge-air cooler inlet duct 234A. The second charge-air cooler 232B may be fluidly coupled to an outlet of the second compressor 226B of the second turbocharger 222B via a second charge-air cooler inlet duct 234B. The first charge-air cooler inlet duct 234A may be substantially identical to the second charge-air cooler inlet duct 234B in size and shape. In some examples, additionally or alternatively, the first charge-air cooler inlet duct 234A and the second charge-air cooler inlet duct 234B may be sized, shaped, and/or oriented differently based on one or more of the turbocharger system 220 and the charge-air cooler system 230. For example, one or more of the turbochargers and charge-air coolers may be angularly arranged to meet packaging restraints, which may result in one of the charge-air cooler inlet ducts being similarly arranged.

As will be described in greater detail below, the first and second compressors 226A, 226B may be oriented differently to allow an orientation of the first and second charge-air coolers 232A, 232B to be angled such that a stator adapter and an alternator may be arranged below the charge-air cooler system 230 while still allowing a user to access portions of the stator adapter and the alternator without adjusting the charge-air cooler system 230.

In the examples of FIGS. 2 and 3, each of the first and second charge-air cooler inlet ducts 234A, 234B comprise a member comprise a square pyramid shaped body with an inlet extending toward the central axis 292 and the first and second turbochargers 222A, 222B, respectively. The inlet may extend upwardly, angled relative to the central axis 292. A cross-section of the first and second charge-air cooler inlet ducts 234A, 234B may be parallelogram or trapezoid shaped.

Each of the first and second charge-air coolers 232A, 232B may comprise first and second charge-air cooler outlet ducts 236A, 236B shaped to flow cooled charge-air to the first and second cylinder groups 202A, 202B. The first and second charge-air cooler outlet ducts 236A, 236B may be similarly shaped and sized, wherein each of the outlet ducts extends along an axis substantially parallel to the central axis 292.

As described above with respect to FIG. 1, the charge-air cooler system 230 may be fluidly coupled to a cooling system, such as cooling system 150 of FIG. 1. Charge-air cooler system piping 250 may be shaped to flow coolant to and from the first and second charge-air cooler 232A, 232B from the cooling system 150.

In this way, the turbocharger system 220 and the charge-air cooler system 230 are arranged on the rear side 212 of the engine 104, wherein each of the turbocharger system 220 and the charge-air cooler system 230 comprise two or more turbochargers and charge-air coolers. The turbocharger system 220 and the charge-air cooler system 230 may be mounted on the rear side 212 of the engine 104 via the turbocharger bracket 240, which may be further shaped to provide a sufficient amount of clearance to arrange an alternator, described in greater detail below.

Figure 4A:
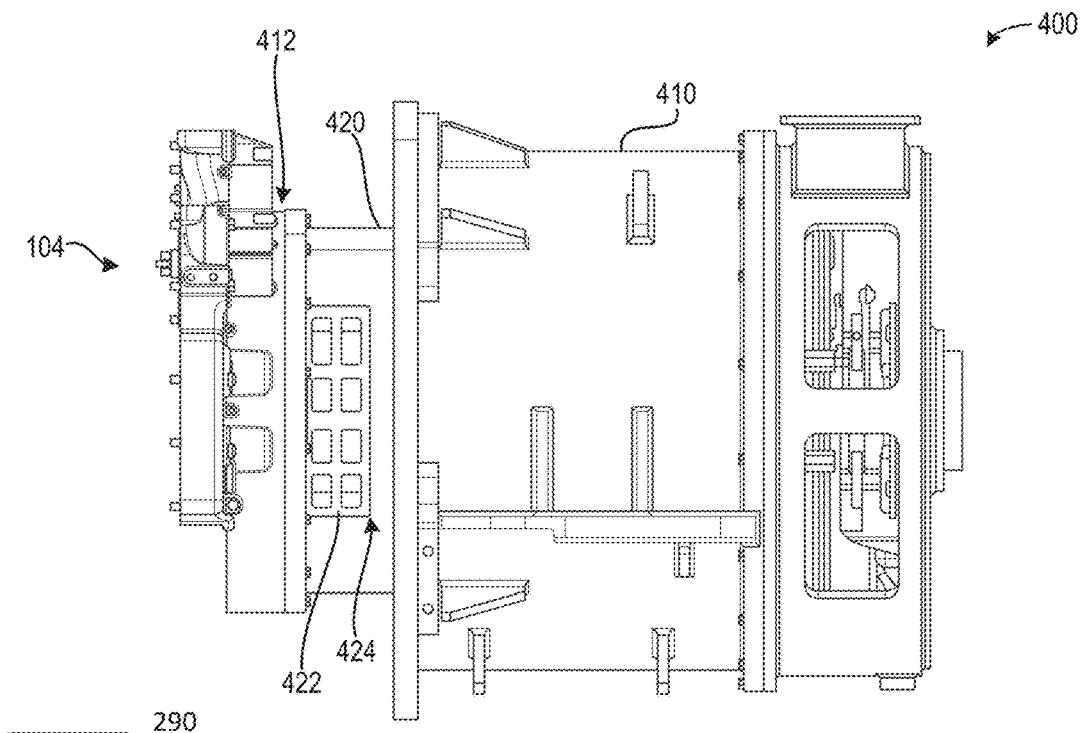
FIGS. 4A and 4B show an alternator and a stator coupled to a portion of the engine near the CAC system.
Figure 4B:
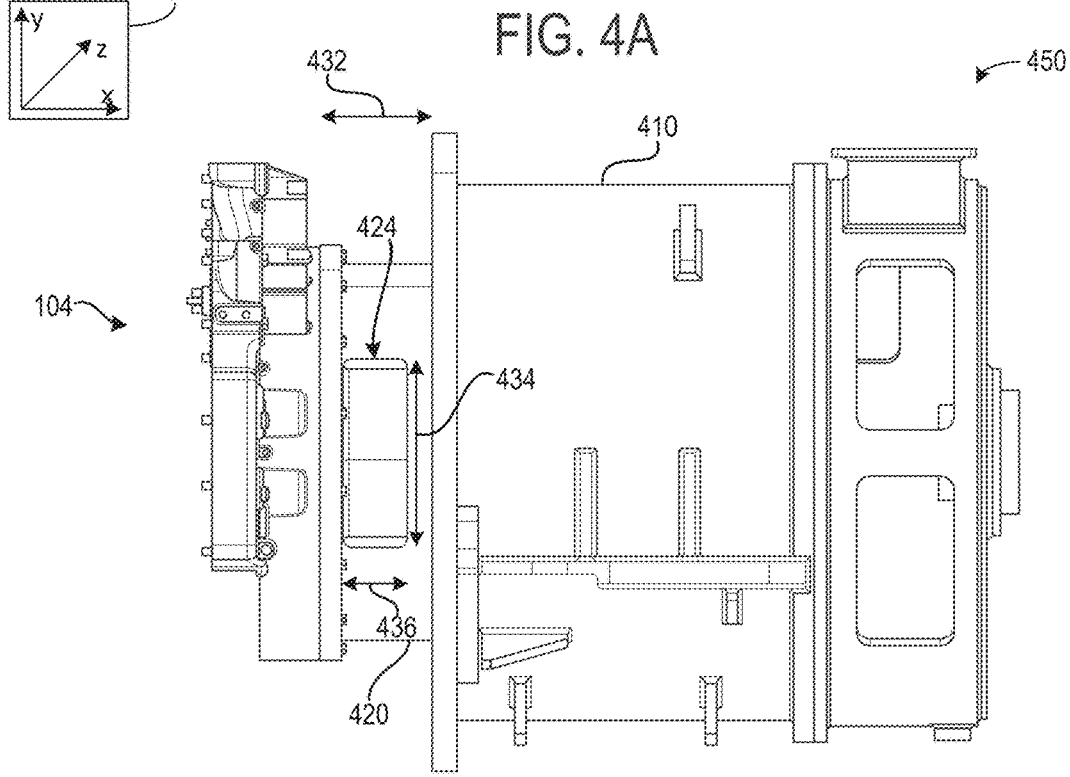

Turning now to FIGS. 4A and 4B, they show side-on views 400 and 450, respectively, of an alternator 410 and a stator adapter 420. The embodiment of FIG. 4A further includes a cover 422 (e.g., a sheet metal cover) being arranged in an accessibility window 424. The cover 422 is omitted from the embodiment of FIG. 4B. FIGS. 4A and 4B may be described in tandem herein.

As is known by those of ordinary skill in the art, the alternator 410 may be configured to replenish electrical energy to various electrical systems when engine 104 is combusting. Components previously introduced may be similarly numbered in subsequent figures. The stator adapter 420 may comprise a first function which includes converting rotational energy produced via a combination of the engine 104 and the alternator 410. The stator adapter 420 may further comprise a second function which includes coupling the adapter 420 to the engine 104. Thus, the stator adapter 420 may be in face-sharing contact with and physically coupled to the engine 104. In this way, the stator adapter 420 may be directly between the alternator 410 and the engine 104.

The stator adapter 420 may be coupled to the engine 104 before the stator adapter 420 is coupled to the alternator 410. The stator adapter 420 may be physically coupled to the engine 104 via one or more of welds, fusions, adhesives, and fasteners. In one example, the stator adapter 420 is physically coupled to the engine 104 via bolts.

An alternator rotor of the alternator 410 may be physically coupled to an engine flywheel flange. Since the stator adapter 420 is physically coupled to the engine 104 prior to installation of the alternator 410, the stator adapter 420 may be fitted with the accessibility window 424, which may allow a user to access internal components of the alternator 410 and the engine 104. More specifically, the user may physically couple an engine flywheel to an alternator rotor after the stator adapter 420 is coupled to the engine 104. The physical coupling may include fastening a bolt in a direction parallel to bolt direction 442 from the engine flywheel flange to an alternator rotor adapter, the alternator rotor adapter being arranged interior to and concentric with the stator adapter 420 about the central axis 292.

A width 432 of the stator adapter 420 may correspond to a space between the engine 104 and the alternator 410. The width 432 may be between 200 to 400 mm. In some examples, additionally or alternatively, the width 432 may be between 200 to 300 mm. In some examples, additionally or alternatively, the width 432 may be between 250 to 300 mm. In some examples, additionally or alternatively, the width 432 may be between 260 to 300 mm. In some examples, additionally or alternatively, the width 432 may be between 270 to 300 mm. In some examples, additionally or alternatively, the width 432 may be between 280 to 300 mm. In some examples, additionally or alternatively, the width 432 may be between 285 to 295 mm. In some examples, additionally or alternatively, the width 432 may be between 287 to 291 mm. In one example, the width 432 is equal to exactly 289.154 mm.

The accessibility window 424 may be a single cutout arranged in the stator adapter 420. Additionally or alternatively, the accessibility window 424 may be one of a plurality of accessibility windows arranged around a circumference of the stator adapter 420. The accessibility window 424 may comprise a square or rectangular shape following a profile of the stator adapter 420. The accessibility window 424 may comprise a height 434 between 300 to 500 mm. In some examples, additionally or alternatively, the accessibility window 424 may comprise a height 434 between 350 to 450 mm. In some examples, additionally or alternatively, the accessibility window 424 may comprise a height 434 between 370 to 430 mm. In some examples, additionally or alternatively, the accessibility window 424 may comprise a height 434 between 390 to 410 mm. In one example, the height 434 is exactly equal to 400 mm.

A width 436 of the accessibility window 424 may be between 100 to 200 mm. In some examples, additionally or alternatively, the width 436 of the accessibility window 424 may be between 120 to 180 mm. In some examples, additionally or alternatively, the width 436 of the accessibility window 424 may be between 120 to 160 mm. In some examples, additionally or alternatively, the width 436 of the accessibility window 424 may be between 130 to 150 mm. In some examples, additionally or alternatively, the width 436 of the accessibility window 424 may be between 135 to 145 mm. In one example, the width 436 is exactly equal to 140 mm. The width 436 may be equal to half of the width 432.

At any rate, dimensions of the accessibility window 424 may be sized based on a space desired to install bolts through a flexplate of the engine 104 and into the rotor of the alternator 410. The accessibility window 424 may be further sized to decrease a packaging constraint of the alternator 410 and the stator adapter 420. The accessibility window 424 may be covered and/or made inaccessible via the cover 422, which may be removed by the user.

The alternator 410 may further include a shimmed portion 412, which may be shaped to accommodate the turbocharger bracket (e.g., turbocharger bracket 240 of FIG. 2). Additionally or alternatively, the shimmed portion 412 may be shimmed to provide clearance to the accessibility window 424 and/or increase a durability of the alternator 410.

Turning now to FIG. 5A, it shows a top-down view 500 of the charge-air cooler system 230 and the turbocharger system 220 being coupled to the engine 104 via the turbocharger bracket 240. Additionally, the alternator 410 may be coupled to the engine 104 via the stator adapter and arranged such that it is below each of the turbocharger system 220 and the charge-air cooler system 230.

The first charge-air cooler 232A and the second charge-air cooler 232B may be symmetrically arranged on opposite sides of the alternator 410. First turbine 224A and first compressor 226A and second turbine 224B and second compressor 226B may be arranged closer to the central axis 292 symmetrically on opposite sides of the alternator 410 than the first and second charge-air coolers 232A, 232B. Thus, a shortest distance between the central axis 292 and either of the turbochargers may be less than a shortest distance between the central axis 292 and either of the charge-air coolers.

Turning now to FIG. 5B, it shows a side-on view 550 of the engine 104 being coupled to each of the stator adapter 420, the turbocharger system 220, and the charge-air cooler system 230. The side-on view 550 further illustrates the cover 422 being arranged to at least somewhat occlude the accessibility window 424. As illustrated, the first charge-air cooler 232A, including the first charge-air cooler outlet duct 236A, may be arranged above the accessibility window 424. In one example, no portion of the first charge-air cooler 232A occludes the accessibility window 424. In this way, the user may more easily access the accessibility window 424 to install and/or repair components of the alternator 410 and stator adapter 420 and engine 104 free of disassembling any portion of the charge-air cooler system 430 and the turbocharger system 220.

Turning now to FIGS. 6A and 6B, they show a face-on view 600 and a side-on view 650 of the engine 104 coupled to each of the stator adapter 420, turbocharger system 220, and charge-air cooler system 430, respectively. A vertical central axis 602 and a horizontal central axis 604 of the alternator 410 are shown. Additionally, a vertical central axis 612A of the first compressor 226A is shown. A vertical central axis 612B of the second compressor 226B is shown. Each of the vertical central axes of the compressors and the alternator may be substantially parallel to one another. A horizontal central axis 614 represents a horizontal central axis of each of the first compressor 226A and the second compressor 226B. In some embodiments, the horizontal central axes of the compressors may not align such that their geometric centers are misaligned and/or offset.

Distance 622 represents a distance between the first compressor 226A and the second compressor 226B. More specifically, the distance 622 may be measured from nearest portions of the first and second compressors 226A, 226B. The distance 622 may be between 130 to 250 mm. In one example, the distance 622 is greater than at least 150 mm. In one example, the distance 622 is exactly equal to 152 mm.

First and second distances 624A and 624B may correspond to distances between each of the vertical central axes 612A, 612B and the vertical central axis 602. In one example, the first and second distances 624A and 624B are substantially equal. The first and second distances 624A and 624B may be between 400 to 600 mm. In some examples, additionally or alternatively, the first and second distances 624A and 624B may be between 450 to 500 mm. In some examples, the first and second distances 624A and 624B may be greater than at least 470 mm. In one example, the first and second distances 624A and 624B are exactly equal to 480 mm. In some embodiments, the first and second distances 624A and 624B may be different.

Distance 625 may correspond to a vertical distance between the horizontal central axis 614 and the horizontal central axis 604 of the alternator 410. The distance 625 may be greater than 1400 mm in one example. In some examples, the distance 625 is between 1300 to 1500 mm. In some examples, additionally or alternatively, the distance 625 is between 1350 to 1450 mm. In one example, the distance 625 is exactly equal to 1402 mm.

In some examples, each of the distances 622, 624A, 624B, and 625 may be dependent such that adjusting one of the distances may result in an adjustment of each of the other distances. In one example, the dependency is directly proportional such that increasing one distance results in a similar increase of the other distances, wherein the similar increase maintains a previous relationship and/or ratio of the distances. Additionally or alternatively, the distances may be inversely proportional such that increasing one distance may result in decreasing the other distances. In some examples, additionally or alternatively, the distances may be unrelated, such that adjusting one distance may not result in an adjustment to the other distances. In other examples, additionally or alternatively, some of the distances may be dependent. For example, the distances 622 and 624A and 624B may be dependent, while the distance 625 may be independent. As such, adjustments to the distance 625 may not result in adjustments to the distances 622, 624A, and 624B. However, an adjustment to the distance 622 may result in an adjustment to one or more of the distances 624A and 624B without an adjustment to the distance 626.

The face-on view 600 further illustrates an orientation of the first compressor 226A and the second compressor 226B. The first compressor 226A may be oriented at a first angle 626A with relation to horizontal central axis 614 of the compressors 226A, 226B, wherein the first angle 626A may be between 50 to 60 degrees. Specifically, the first angle is defined as the angle between the horizontal central axis and a plane defined by the compressor outlet, that is, a plane of the compressor outlet that is normal to a central axis of compressor outlet. In some examples, additionally or alternatively, the first angle 626A may be between 52 to 58 degrees. In some examples, additionally or alternatively, first angle 626A may be between 54 to 58 degrees. In one example, the first angle 626A is exactly equal to 56 degrees.

The second compressor 226B may be oriented at a second angle 626B with relation to horizontal central axis 604, wherein the second angle 626B may be between 5 to 20 degrees. In some examples, additionally or alternatively, the second angle 626B may be between 8 to 16 degrees. In some examples, additionally or alternatively, the second angle 626B may be between 10 to 14 degrees. In one example, the second angle 626B is exactly equal to 12 degrees. Specifically, the second angle is defined as the angle between the horizontal central axis 614 of the first and second compressors 226A, 226B and a plane defined by the compressor outlet, that is, a plane of the compressor outlet of the second compressor 226B that is normal to a central axis of compressor outlet, wherein boost air may flow parallel to the central axis of the compressor outlet.

In this way, the first angle 626A and the second angle 626B may be unequal. By doing this, orientations of the first charge-air cooler 232A and the second charge-air cooler 232B may be adjusted to increase a compactness of the engine 104 and to allow access to the accessibility window (e.g., accessibility window 424 of FIGS. 4A and 4B) to be maintained on both sides of the engine 104.

Due to the first angle 626A being greater than the second angle 626B, a height 634A of the first charge-air cooler inlet duct 234A may be less than a height 634B of the second charge-air cooler inlet duct 234B. The height 634A may be greater than 160 mm in some examples. Additionally or alternatively, the height 634A may be between 140 to 180 mm. In some examples, additionally or alternatively, the height 634A may be between 150 to 170 mm. In some examples, additionally or alternatively, the height 634A may be between 155 to 170 mm. In one example, the height 634A is exactly 164 mm.

The height 634B may be greater than 200 mm. In some examples, additionally or alternatively, the height 634B may be between 180 to 260 mm. In some examples, additionally or alternatively, the height 634B may be between 200 to 240 mm. In some examples, additionally or alternatively, the height 634B may be between 210 to 230 mm. In one example, the height 634B is exactly 220 mm. Based on the heights of the first and second charge-air cooler inlet ducts 234A, 234B, the first compressor 226A may be arranged lower than the second compressor 226B. In one example, a maximum height of the first and second charge-air cooler inlet ducts 234A, 234B is less than 250 mm.

The face-on view 600 shows a cabin 606 which may house the engine 104 and the other above described components (e.g., the turbocharger system 220 and the charge-air cooler 230 of FIGS. 2 and 3, and the alternator 410). A distance 608 may represent a shortest distance between a surface of the cabin 606 and an outer perimeter of the second turbine 224B. The distance 608 may be similar to a distance between the surface of the cabin 606 and an outer perimeter of the second turbine 224B. The distance 608 may be less than 100 mm. In some examples, additionally or alternatively, the distance 608 may be between 65 to 95 mm. In some examples, additionally or alternatively, the distance 608 may be between 75 to 85 mm. In one example, the distance 608 is equal to exactly 79 mm.

Distance 609 may represent a vertical distance between the first turbine 224A and the surface of the cabin 606. The distance 609 may be similar to a vertical distance between the second turbine 224B and the surface of the cabin 606. The distance 609 may be less than 200 mm. In some examples, additionally or alternatively the distance 609 is between 120 to 180 mm. In some examples, additionally or alternatively the distance 609 is between 140 to 180 mm. In some examples, additionally or alternatively the distance 609 is between 160 to 180 mm. In some examples, additionally or alternatively the distance 609 is between 165 to 170 mm. In one example, the distance 609 is equal to exactly 167 mm.

Distances 628A and 628B may correspond to distances between the first and second compressor 226A, 226B outlets and first and second charge-air cooler inlet ducts 234A, 234B, respectively. In one examples, the distances 628A and 628B are exactly identical. The distances 628A and 628B may be between 60 to 70 mm. In some examples, additionally or alternatively, the distances 628A and 628B may be between 62 to 68 mm. In some examples, additionally or alternatively, the distances 628A and 628B may be between 64 to 66 mm. In one example, the distances 628A and 628B are exactly equal to 65 mm. In some examples, the distances 628A and 628B may be unequal.

Distance 629 represent a vertical distance between the first and second compressors 226A, 226B and the first and second charge-air cooler inlet ducts, respectively. The distance 629 may be less than 120 mm. In some examples, additionally or alternatively, the distance 629 may be between 60 to 100 mm. In some examples, additionally or alternatively, the distance 629 may be between 70 to 100 mm. In some examples, additionally or alternatively, the distance 629 may be between 80 to 100 mm. In some examples, additionally or alternatively, the distance 629 may be between 85 to 95 mm. In one example, the distance 629 are equal to exactly 90 mm.

A first distance 636A represents a distance the first charge-air cooler 232A extends outside of an outline of the engine 104. A second distance 636B represent a distance the second charge-air cooler 232B extends outside of the outline of the engine 104. Additionally or alternatively, the first and second distances may correspond to a distance between the charge-air coolers and the cabin 606. The outline of the engine 104 may be symmetric, as shown. The first distance 636A may be greater than the second distance 636B in some examples. Additionally or alternatively, the first distance may be equal to or less than the second distance 636B. Each of the first and second distances 636A, 636B may be less than 100 mm. In one example, the first distance 636A is equal to exactly 80 mm. In one example, the second distance 636B is equal to exactly 53 mm. Thus, in one example, the first charge-air cooler 232A may be closer to the cabin 606 than the second charge-air cooler 232B.

Distance 636 may represent a total distance between furthest surfaces of the first and second charge-air coolers 232A, 232B. The distance 636 may be less than 2000 mm. In some examples, additionally or alternatively, the distance 636 may be between 1650 to 1950 mm. In some examples, additionally or alternatively, the distance 636 may be between 1750 to 1900 mm. In some examples, additionally or alternatively, the distance 636 may be between 1800 to 1900 mm. In some examples, additionally or alternatively, the distance 636 may be between 1800 to 1850 mm. In one example, the distance 636 is equal to exactly 1834 mm.

Distance 638 represents a vertical distance between the horizontal central axis 604 and a bottom of the first charge-air cooler 232A. The distance 638 may be less than 400 mm. In some examples, additionally or alternatively, the distance 638 is between 320 to 360 mm. In some examples, additionally or alternatively, the distance 638 is between 330 to 350 mm. In some examples, additionally or alternatively, the distance 638 is between 340 to 345 mm. In one example, the distance 638 is equal to exactly 341 mm.

In some examples, the distance 638 may additionally represent a distance between the horizontal central axis 604 and a bottom of the second charge-air cooler 232B. As such, closest distances measured from first and second charge-air coolers to the horizontal central axis 604 may be equidistant. Equidistant may define two closest distances measured between two different components and a common location as being equal. In some examples, additionally or alternatively, the horizontal central axis 604 may traverse a center of the accessibility window such that each of the first and second charge-air coolers are equidistant to the accessibility window. Thus, vertical positions of the first and second charge-air coolers may be substantially similar while horizontal positions of the first and second charge-air coolers may be different, wherein the second charge-air cooler is arranged more horizontally inward compared to the first charge-air cooler relative to the vertical central axis 602. Additionally or alternatively, the distance 638 may be greater than or less than the distance between the horizontal central axis 604 and a bottom of the second charge-air cooler 232B.

Distance 652 represents a distance between the surface of the cabin 606 and the horizontal central axis 604. The distance 652 may be less than 2000 mm. In some examples, additionally or alternatively, the distance 652 is between 1700 to 1900. In some examples, additionally or alternatively, the distance 652 is between 1750 to 1850. In some examples, additionally or alternatively, the distance 652 is between 1780 to 1820. In some examples, additionally or alternatively, the distance 652 is between 1810 to 1820. In one example, the distance 652 is equal to exactly 1813 mm.

Distance 654 represents a distance between the surface of the cabin 606 and a lowest portion of the engine 104. The distance 654 may be less than 2400 mm. In some examples, additionally or alternatively, the distance 654 may be between 2100 to 2350. In some examples, additionally or alternatively, the distance 654 may be between 2200 to 2350. In some examples, additionally or alternatively, the distance 654 may be between 2250 to 2350. In some examples, additionally or alternatively, the distance 654 may be between 2280 to 2320. In some examples, additionally or alternatively, the distance 654 may be between 2290 to 2300. In one example, the distance 654 is equal to exactly 2295. In some examples, the distance 654 is less than 2300 mm.

Distance 656 represents a distance between a back end of the first charge-air cooler 232A and an outline of a package of the engine assembly. The distance 656 may be less than 300 mm. In some examples, additionally or alternatively, the distance 656 may be between 265 to 295 mm. In some examples, additionally or alternatively, the distance 656 may be between 270 to 290 mm. In some examples, additionally or alternatively, the distance 656 may be between 275 to 285 mm. In some examples, additionally or alternatively, the distance 656 may be between 278 to 282 mm. In one example, the distance 656 is equal to exactly 280 mm.

Angle 658 represents an orientation of the first charge-air cooler 232A. The angle 658 may be relative to a horizontal axis, such as central axis 292 and/or to a general direction of compressed air flow through the first charge-air cooler outlet 236A, in the orientation of the engine 104 in FIG. 6B, and a plane defined by a portion of the first charge-air cooler 232A interfacing with its inlet. The general direction of air flow through the first charge-air cooler outlet 236A may be substantially parallel to the central axis 292. The angle 658 may be less than 50 degrees and greater than 0 degrees. In some examples, additionally or alternatively, the angle 658 is between 5 to 35 degrees. In some examples, additionally or alternatively, the angle 658 is between 10 to 30 degrees. In some examples, additionally or alternatively, the angle 658 is between 15 to 25 degrees. In one example, the angle 658 is equal to exactly 20 degrees.

In some examples, the angle 658 may be substantially similar to an angle corresponding to an orientation of the second charge-air cooler 232B (e.g., second angle 628B of FIG. 6A). Additionally or alternatively, the angle 658 may be greater than or less than the angle corresponding to the orientation of the second charge-air cooler 232B.

Turning now to FIG. 7A, it shows an embodiment 700 of the turbocharger system 220 coupled to a charge-air cooler system 730. The embodiment 700 may be substantially similar to the embodiments 200 and 300 of FIGS. 2 and 3 except that the charge-air cooler system 730 may comprise a single, charge-air cooler 732, as opposed to the first and second charge-air coolers 232A, 232B of the charge-air cooler system 230 illustrated in FIGS. 2 and 3. However, it will be appreciated that charge-air cooler system 730 may be mounted via turbocharger bracket 240.

The charge-air cooler 732 may comprise a first charge-air cooler inlet 734A coupling the first compressor 226A to an overall charge-air cooler inlet duct 734. A second charge-air cooler inlet 734B may be shaped to fluidly couple the second compressor 226B to the overall charge-air cooler inlet duct 734. In some examples, the overall charge-air cooler inlet duct 734 may be compartmentalized to maintain a separation of charge-air flows from the first compressor 234A and the second compressor 234B. Said another way, the overall charge-air cooler inlet duct 734 may be divided into halves hermetically sealing gases received from the first and second charge-air cooler inlets 734A, 734B. Additionally or alternatively, in some embodiments, the overall charge-air cooler inlet duct 734 may be a single, open space where charge air from the compressors may mix.

An overall charge-air cooler inlet duct height 721 may be less than 200 mm. In some examples, additionally or alternatively, the overall charge-air cooler inlet duct height 721 may be equal to a value between 120 to 180 mm. In some examples, additionally or alternatively, the overall charge-air cooler inlet duct height 721 may be equal to a value between 130 to 170 mm. In some examples, additionally or alternatively, the overall charge-air cooler inlet duct height 721 may be equal to a value between 140 to 160 mm. In some examples, additionally or alternatively, the overall charge-air cooler inlet duct height 721 may be equal to a value between 145 to 155 mm. In one example, the overall charge-air cooler inlet duct height 721 is equal to exactly 150 mm. In one example, the overall charge-air cooler inlet duct height 721 of the first and second inlet ducts is less than 250 mm.

The first charge-air cooler inlet 734A and the second charge-air cooler inlet 734B may be arranged somewhat opposite one another. More specifically, the first charge-air cooler inlet 734A may be arranged to extend in a first direction and the second charge-air cooler inlet 734B may be arranged to extend in a second direction opposing the first direction.

More specifically, the first compressor 226A may be oriented to generate a first angle 726A with relation to a horizontal central axis 714 of the turbocharging system 220. The first angle 726A may be an angle generated between the horizontal central axis 714 of the compressors and a general direction of charge-air flow through the first compressor 226A outlet. The angle 726A may be based on a space between the charge-air cooler system 730 and the accessibility window (e.g., accessibility window 424 of FIGS. 4A and 4B). The first angle 726A may be less than 80 degrees. In some examples, additionally or alternatively, the first angle 726A may be between 30 to 70 degrees. In some examples, additionally or alternatively, the first angle 726A may be between 40 to 60 degrees. In some examples, additionally or alternatively, the first angle 726A may be between 45 to 55 degrees. In some examples, additionally or alternatively, the first angle 726A may be between 47 to 53 degrees. In one example, the first angle 726A is equal to exactly 50 degrees.

The second compressor 226B may be oriented to generated a second angle 726B with relation to the horizontal central axis 714. The second angle 726B may be based on a space between the charge-air cooler system 730 and the accessibility window (e.g., accessibility window 424 of FIGS. 4A and 4B). The second angle 726B may be different than the first angle 726A. In some examples, the second angle 726B is less than the first angle 726A. The second angle 726B may be an angle generated between the horizontal central axis 714 of the compressors and a general direction of charge-air flow through the second compressor 226B outlet. In some examples, additionally or alternatively, the second angle 726B may be between 0 and 20 degrees. In some examples, additionally or alternatively, the second angle 726B may be between 0 and 15 degrees. In some examples, additionally or alternatively, the second angle 726B may be between 0 and 10 degrees. In some examples, additionally or alternatively, the second angle 726B may be between 2 and 8 degrees. In some examples, additionally or alternatively, the second angle 726B may be between 4 and 6 degrees. In one example, the second angle 726B is equal to exactly 5 degrees.

The charge-air cooler 732 may comprise first and second compartments shaped to receive charge-air from the overall charge-air cooler inlet duct 734. More specifically, charge-air from the first compressor 226A may be directed to the first compartment and charge-air from the second compressor 226B may be directed to the second compartment, wherein the charge-air flows may be maintained separate and do not mix. The first and second compartments may be described in greater detail below with respect to FIG. 7C.

A charge-air cooler inlet distance 702 may relate to a distance between the first charge-air cooler inlet duct 734A and the second charge-air cooler inlet duct 734B. The charge-air cooler inlet distance 702 may be equal to a value between 250 and 350 mm. In some examples, additionally or alternatively, the charge-air cooler inlet distance 702 may be between 270 and 330 mm. In some examples, additionally or alternatively, the charge-air cooler inlet distance 702 may be between 280 and 310 mm. In some examples, additionally or alternatively, the charge-air cooler inlet distance 702 may be between 285 and 300 mm. In one example, the charge-air cooler inlet distance 702 is equal to exactly 293 mm.

A first compressor distance 704A may relate to a distance between a vertical central axis 602 of the alternator 410 and a vertical central axis 712A of the first compressor 226A. A second compressor distance 704B may relate to a distance between the vertical central axis 602 of the alternator 410 and a vertical central axis 712B of the second compressor 226B. Each of the vertical central axis 602, 712A, and 712B may be substantially parallel to one another. Furthermore, in some examples, the first compressor distance 704A and the second compressor distance 704B may be substantially identical. The first and second compressor distances 704A, 704B may be equal to a value between 450 to 510 mm. In some examples, the first and second compressor distances 704A, 704B may be equal to a value between 460 to 500 mm. In some examples, the first and second compressor distances 704A, 704B may be equal to a value between 470 to 490 mm. In some examples, the first and second compressor distances 704A, 704B may be equal to a value between 475 to 485 mm. In one example, the first and second compressor distances 704A, 704B are equal to exactly 480 mm.

A first compressor charge-air cooler spacing 708A may represent a space between the first compressor 226A and the first charge-air cooler inlet 734A. A second compressor charge-air cooler spacing 708B may represent a space between the second compressor 226B and the second charge-air cooler inlet 734B. The first compressor charge-air cooler spacing 708A and the second compressor charge-air cooler spacing 708B may be substantially identical. In some examples, additionally or alternatively, the first and second compressor charge-air cooler spacings 708A, 708B may be equal to a value between 60 to 100 mm. In some examples, additionally or alternatively, the first and second compressor charge-air cooler spacings 708A, 708B may be equal to a value between 70 to 90 mm. In some examples, additionally or alternatively, the first and second compressor charge-air cooler spacings 708A, 708B may be equal to a value between 75 to 85 mm. In one example, the first and second compressor charge-air cooler spacings 708A, 708B are equal to exactly 80 mm.

Cabin 606 may comprise a first cabin gap 706A between it and the first compressor 226A. Furthermore, the cabin 606 may comprise a second cabin gap 706B between it and the second compressor 226B. Despite different angular orientations of the compressors, the first cabin gap 706A and the second cabin gap 706B may be substantially identical. In some examples, the first and second cabin gaps 706A, 706B may be equal to a value between 30 to 80 mm. In some examples, additionally or alternatively, the first and second cabin gaps 706A, 706B may be equal to a value between 40 to 70 mm. In some examples, additionally or alternatively, the first and second cabin gaps 706A, 706B may be equal to a value between 40 to 70 mm. In some examples, additionally or alternatively, the first and second cabin gaps 706A, 706B may be equal to a value between 45 to 60 mm. In some examples, additionally or alternatively, the first and second cabin gaps 706A, 706B may be equal to a value between 50 to 55 mm. In one example, the first and second cabin gaps 706A, 706B are equal to exactly 53 mm. In this way, a combination of the charge-air cooler system 730 and the turbocharger system 220 may be closer to the cabin 606 than the combination of the charge-air cooler system 230 and the turbocharger system 220 shown in FIGS. 6A and 6B.

The charge-air cooler 732 may further comprise a first charge-air cooler outlet 736A which may be shaped to flow charge-air from the first compartment of the charge-air cooler 732 to a first group of cylinders (e.g., first cylinder group 202A of FIGS. 2 and 3). The charge-air cooler 732 may further comprise a second charge-air cooler outlet 736B which may be shaped to flow charge-air from the second compartment of the charge-air cooler 732 to a second group of cylinders (e.g., second cylinder group 202B of FIGS. 2 and 3). The first and second charge-air cooler outlets 736A, 736B extend along an exterior longitudinal surface of the engine (e.g., engine 104 of FIGS. 2 and 3) similarly to the first and second charge-air cooler outlet ducts 236A, 236B of FIGS. 2 and 3.

Distance 722 may represent a width measured from an outer portion of the first charge-air cooler outlet duct 236A to an outer portion of the second charge-air cooler outlet duct 236B. The distance 722 may be less than 1800 mm. In some examples, additionally or alternatively, the distance 722 may be equal to a value between 1200 to 1600 mm. In some examples, additionally or alternatively, the distance 722 may be equal to a value between 1300 to 1600 mm. In some examples, additionally or alternatively, the distance 722 may be equal to a value between 1400 to 1600 mm. In some examples, additionally or alternatively, the distance 722 may be equal to a value between 1400 to 1500 mm. In some examples, additionally or alternatively, the distance 722 may be equal to a value between 1420 to 1480 mm. In some examples, additionally or alternatively, the distance 722 may be equal to a value between 1400 to 1460 mm. In some examples, additionally or alternatively, the distance 722 may be equal to a value between 1440 to 1450 mm. In one example, distance 722 is equal to exactly 1443 mm.

A distance 716 may represent a space between the horizontal central axis 604 and a top of the cabin 606. The distance 716 may be less than 2000 mm. In some examples, additionally or alternatively, the distance 716 is between 1700 to 1900. In some examples, additionally or alternatively, the distance 716 is between 1750 to 1850. In some examples, additionally or alternatively, the distance 716 is between 1780 to 1820. In some examples, additionally or alternatively, the distance 716 is between 1810 to 1820. In one example, the distance 716 is equal to exactly 1813 mm. In some examples, the distance 716 may be exactly equal to the distance 652 of FIG. 6B.

A distance 717 may represent a space between the horizontal central axis 604 and a highest point of the turbocharger system 230. The distance 717 may be less than 1800 mm. In some examples, additionally or alternatively, the distance 717 may be between 1500 to 1800 mm. In some examples, additionally or alternatively, the distance 717 may be between 1600 to 1700 mm. In some examples, additionally or alternatively, the distance 717 may be between 1620 to 1680 mm. In some examples, additionally or alternatively, the distance 717 may be between 1640 to 1660 mm. In some examples, additionally or alternatively, the distance 717 may be between 1650 to 1660 mm. In one example, the distance 717 is equal to exactly 1656.5 mm.

Distance 718 may represent a space between the horizontal central axis 604 and a horizontal central axis 714 of the turbocharger system 230. The distance 718 may be greater than 1400 mm in one example. In some examples, the distance 718 is between 1300 to 1500 mm. In some examples, additionally or alternatively, the distance 718 is between 1350 to 1450 mm. In one example, the distance 718 is exactly equal to 1435 mm. In some examples, the distance 718 may be greater than the distance 625 of FIG. 6A.

Distance 719 may represent a space between the horizontal central axis 604 and a central axis 738 of the charge-air cooler 732. In some examples, the distance 719 may be less than 1000 mm. In some examples, additionally or alternatively, the distance 719 may be equal to a value between 800 to 900 mm. In some examples, additionally or alternatively, the distance 719 may be equal to a value between 820 to 880 mm. In some examples, additionally or alternatively, the distance 719 may be equal to a value between 820 to 860 mm. In some examples, additionally or alternatively, the distance 719 may be equal to a value between 830 to 850 mm. In some examples, additionally or alternatively, the distance 719 may be equal to a value between 835 to 845 mm. In one example, the distance 719 is equal to exactly 840 mm.

FIG. 7B shows an isometric view 725 of the embodiment 700 of FIG. 1A.

Turning now to FIG. 7C, it shows an embodiment 750 of the charge-air cooler 732. Therein, the charge-air cooler 732 comprises a length 752, a width 754, and a height 756. The length 752 may be less than 1500 mm. In some examples, additionally or alternatively, the length 752 may be equal to a value between 1000 and 1200 mm. In some examples, additionally or alternatively, the length 752 may be equal to a value between 1050 and 1150 mm. In one example, the length 752 is equal to exactly 1100 mm.

The width 754 may be less than 800 mm. In some examples, additionally or alternatively, the width 754 may be equal to a value between 450 to 550 mm. In some examples, additionally or alternatively, the width 754 may be equal to a value between 480 to 550 mm. In some examples, additionally or alternatively, the width 754 may be equal to a value between 500 to 550 mm. In some examples, additionally or alternatively, the width 754 may be equal to a value between 510 to 530 mm. In one example, the width 754 is equal to exactly 520 mm.

The height 756 may be less than 800 mm. In some examples, additionally or alternatively, the height 756 may be equal to a value between 400 to 500 mm. In some examples, additionally or alternatively, the height 756 may be equal to a value between 420 to 480 mm. In some examples, additionally or alternatively, the height 756 may be equal to a value between 440 to 470 mm. In some examples, additionally or alternatively, the height 756 may be equal to a value between 455 to 465 mm. In one example, the height 756 is equal to exactly 460 mm.

The charge-air cooler 732 is shown divided into two halves via divider 758. The two halves may be fluidly separated from one another such that gases in a first half do not mix with gases in a second half. Additionally or alternatively, the charge-air cooler 732 may not be divided in halves. As such, charge-air from the first and second compressors 236A, 236B may flow into and mix within the charge-air cooler 732.

Turning now to FIG. 7D, it shows a side-on view 775 of the alternator 410, turbocharger system 220, and charge-air cooler system 730. The side-on view 775 further illustrates an exposure of the stator adapter 420 below the second charge-air cooler outlet 736B. A user may easily access the stator adapter 420 and other components of the alternator 410 and/or engine 104 without loosening or moving components of the charge-air cooler system 730 or turbocharger system 220.

The side-on view 775 further illustrates a protrusion distance 792 of the charge-air cooler 732. The protrusion distance 792 may be measured from a center of the charge-air cooler 732, indicated via a central axis 790, and an extreme end of the charge-air cooler 732 furthest away from the engine 104. In some examples, the protrusion distance 792 is less than 300 mm. In some examples, additionally or alternatively, the protrusion distance 792 may be equal to a value between 200 to 250 mm. In some examples, additionally or alternatively, the protrusion distance 792 may be equal to a value between 210 to 240 mm. In some examples, additionally or alternatively, the protrusion distance 792 may be equal to a value between 220 to 230 mm. In some examples, additionally or alternatively, the protrusion distance 792 may be equal to a value between 222 to 228 mm. In one example, the protrusion distance 792 is equal to exactly 224.9 mm.

The side on view 775 further illustrates a height 778 measured from a lowest portion of the alternator 410 to a highest portion of the turbocharger system 220. The height 778 may be less than 3000 mm in some examples. In some examples, additionally or alternatively, the height 778 may be equal to a value between 2200 to 2400. In some examples, additionally or alternatively, the height 778 may be equal to a value between 2250 to 2350 mm. In some examples, additionally or alternatively, the height 778 may be equal to a value between 2300 to 2350 mm. In some examples, additionally or alternatively, the height 778 may be equal to a value between 2310 to 2340 mm. In some examples, additionally or alternatively, the height 778 may be equal to a value between 2320 to 2330 mm. In one example, the height 778 is equal to exactly 2323 mm.

In this way, an engine comprising a V-configuration may be arranged within a cabin and fitted with a turbocharger system and a charge-air cooler system via a single mounting bracket. The turbocharger system may comprise two turbochargers and the charge-air cooler system may comprise one or more charge air coolers. An orientation of the turbocharger system and the charge-air cooler system may be such that an accessibility window may be free of occlusions and accessible without removing components of the turbocharger system and/or the charge-air cooler system. The technical effect of orienting the turbocharger system and the charge-air cooler system so as not to occlude the accessibility window is to increase manufacturing efficiency. Furthermore, maintenance may be conducted on the engine and/or an alternator more quickly, thereby decreasing maintenance costs and hardships.

In an embodiment, a system (e.g., an engine system for a power generation system or locomotive or other vehicle) includes a turbocharger system, a charge-air cooler system, a turbocharger bracket, and a stator adapter. The turbocharger system is configured to provide charge air to an engine, and includes at least one compressor and one turbine. The charge-air cooler system includes at least one charge-air cooler arranged below the at least one compressor. The turbocharger bracket is arranged directly below the charge-air cooler system and shaped to mount the charge-air cooler and the turbocharger system to the engine. The stator adapter physically couples an alternator to the engine. The stator adapter comprises an accessibility window arranged below the charge-air cooler system. The at least one charge-air cooler is closer to the accessibility window than the turbocharger system. For example, at least one part of the charge-air cooler may be closer to the nearest part of the accessibility window than all parts of the at least one compressor and turbine.

In another embodiment, a system (e.g., an engine system, such as an engine system for a locomotive or other vehicle, or for a power generation unit) includes an engine having a first cylinder group and a second cylinder group. The first cylinder group includes a number of cylinders, and the second cylinder group includes a number of different cylinders of the engine that is equal to the number of cylinders in the first group. For example, the first and second cylinder groups may not have any cylinders in common, and all the cylinders of the first and second groups combined may equal the total number of cylinders of the engine. The system further includes a turbocharger system having a first turbocharger and a second turbocharger. The first turbocharger includes a first compressor and a first turbine in fluid communication with the first cylinder group, and the second turbocharger includes a second compressor and a second turbine in fluid communication with the second cylinder group. The first compressor and the second compressor are equidistant from a cabin configured to house the engine. For example, respective parts of the first compressor and the second compressor that are closest to the cabin may be equidistant from the cabin. The system also includes a charge-air cooler system having a first charge-air cooler and a second charge-air cooler. The first charge-air cooler is positioned to cool only charge-air from the first compressor, and the second charge-air cooler is positioned to cool only charge-air from the second compressor. The first charge-air cooler and the second charge-air cooler are equidistant from an accessibility window of a stator adapter shaped to mount an alternator to a side (e.g., a rear side) of the engine. For example, respective parts of the first charge-air cooler and the accessibility window that are closest to one another may be the same distance apart as respective parts of the second charge-air cooler and the accessibility window that are closest to one another. As another example, center points of inlets or outlets of the first charge-air cooler and the second charge-air cooler may be the same distance from a center point of the accessibility window.

In another embodiment, a system (e.g., an engine system for a power generation unit, or for a locomotive or other vehicle) includes a charge-air cooler system having a single charge-air cooler shaped or configured to receive charge-air flows from a first compressor and a second compressor of a turbocharger system without mixing the charge-air flows. The single charge-air cooler includes a first inlet duct fluidly coupling the first compressor to a first half of the single charge-air cooler and a second inlet duct fluidly coupling the second compressor to a second half of the single charge-air cooler. The first inlet duct is shaped differently than the second inlet duct due to (i.e., in order to accommodate connection to the compressors) a first compressor angle, measured relative to a first compressor horizontal axis and a general direction of charge-air flow through a first compressor outlet, being greater than a second compressor angle measured relative to a second compressor horizontal axis and a general direction of charge-air flow through a second compressor outlet. The system also includes a first outlet duct configured to direct cooled charge-air from the first half to a first cylinder group of an engine and a second outlet duct configured to direct cooled charge-air from the second half to a second cylinder group of the engine.

As mentioned elsewhere herein, terms such as "below," "above," and "height" may be relative to a platform or other support surface on which an engine rests for normal operation to combust fuel for generating mechanical and/or electrical power.

An embodiment of a locomotive engine system comprising a turbocharger system configured to provide charge air to an engine, the turbocharger system comprising at least one compressor and one turbine, a charge-air cooler system comprising at least one charge-air cooler arranged below the at least one compressor, a turbocharger bracket arranged directly below the charge-air cooler system and shaped to mount the charge-air cooler and the turbocharger system to the engine, and a stator adapter physically coupling an alternator to the engine, and where the stator adapter comprises an accessibility window arranged below the charge-air cooler system, and where the at least one charge-air cooler is closer to the accessibility window than the turbocharger system. A first example of the locomotive engine further comprises where the at least one charge-air cooler is a first charge-air cooler, the charge-air cooler system further comprising a second charge-air cooler, the first charge-air cooler configured to provide cooled charge-air to a first cylinder group of the engine and the second charge-air cooler configured to provide cooled charge-air to a second cylinder group. A second example of the locomotive engine, optionally including the first example, further includes where the first charge-air cooler and the second charge-air cooler are respectively physically coupled to opposite sides of the turbocharger bracket. A third example of the locomotive engine, optionally including the first and/or second examples, further includes where the first charge-air cooler is oriented at a first angle less than 80 degrees, and where the second charge-air cooler is oriented at a second angle less than the first angle, wherein the first angle is an angle measured between a central axis of the engine and a plane of the first charge-air cooler at its inlet, and where the second angle is an angle measured between the central axis of the engine and a plane of the second charge-air cooler at its inlet. A fourth example of the locomotive engine, optionally including one or more of the first through third examples, further includes where the at least one compressor and one turbine are a first compressor and a first turbine, and wherein the turbocharger system further comprises a second compressor and a second turbine, the first compressor fluidly coupled to the first charge-air cooler and the second compressor fluidly coupled to the second charge-air cooler via a first charge-air cooler inlet and a second charge-air cooler inlet, respectively, and where the first compressor is lower than the second compressor relative to a support surface on which the engine sits. A fifth example of the locomotive engine, optionally including one or more of the first through fourth examples, further includes where the first compressor is oriented at an angle between 50 to 60 degrees relative to a horizontal axis and a direction of charge-air flow through an outlet of the first compressor, and where the second compressor is oriented at an angle between 5 to 20 degrees relative to the horizontal axis and a direction of charge-air flow through an outlet of the second compressor, and where a first compressor outlet of the first compressor is closer to the accessibility window than a second compressor outlet of the second compressor, wherein the first compressor outlet is directly coupled to the first charge-air cooler inlet and the second compressor outlet is directly coupled to the second charge-air cooler inlet. A sixth example of the locomotive engine, optionally including one or more of the first through fifth examples, further includes where the first charge-air cooler is identical to the second charge-air cooler in size and shape, and where the first charge-air cooler and the second charge-air cooler are equidistant from the accessibility window, and where the first charge-air cooler is closer to a cabin than the second charge air cooler the cabin configured to house the engine. A seventh example of the locomotive engine, optionally including one or more of the first through sixth examples, further includes where the at least one charge-air cooler is the only charge-air cooler, and where the at least one compressor and one turbine are a first compressor and a first turbine, and where the turbocharger system further comprises a second compressor and a second turbine, and where each of the first compressor and second compressor are fluidly coupled to the only charge-air cooler. An eighth example of the locomotive engine, optionally including one or more of the first through seventh examples, further includes where the only charge-air cooler is partitioned to prevent mixing between charge-air from the first compressor and the second compressor within the only charge-air cooler. A ninth example of the locomotive engine, optionally including one or more of the first through eighth examples, further includes where the first compressor is oriented at a first angle less than 80 degrees measured relative to a horizontal central axis of the first compressor and a general direction of charge-air flow through an outlet of the first compressor and where the second compressor is oriented at a second angle, less than the first angle, measured relative to a horizontal central axis of the second compressor and a general direction of charge-air flow through an outlet of the second compressor, and wherein a second compressor outlet is closer to the charge-air cooler than a first compressor outlet. A tenth example of the locomotive engine, optionally including one or more of the first through ninth examples, further includes where the charge-air cooler comprises a first outlet duct and a second outlet duct, and where the first outlet duct is shaped to flow charge-air from the first compressor to a first cylinder group of the engine and where the second outlet duct is shaped to flow charge-air from the second compressor to a second cylinder group of the engine, and where the first and second outlet ducts are equidistant to the accessibility window.

An embodiment of a locomotive engine system comprising an engine having a first cylinder group and a second cylinder group comprising equal numbers of cylinders, a turbocharger system comprising a first turbocharger and a second turbocharger, and where the first turbocharger comprises a first compressor and a first turbine in fluid communication with the first cylinder group, and where the second turbocharger comprises a second compressor and a second turbine in fluid communication with the second cylinder group, and where the first compressor and the second compressor are equidistant from a cabin configured to house the engine, and a charge-air cooler system comprising a first charge-air cooler and a second charge-air cooler, where the first charge-air cooler is positioned to cool only charge-air from the first compressor and where the second charge-air cooler is positioned to cool only charge-air from the second compressor; wherein the first charge-air cooler and the second charge-air cooler are equidistant from an accessibility window of a stator adapter shaped to mount an alternator to a side of the engine. A first example of the locomotive engine further includes where the stator adapter is physically coupled to the engine prior to the alternator, and where the stator adapter further comprises a shimmed portion shaped to fit a turbocharger bracket mounting the charge-air cooler system and the turbocharger system to the side of the engine directly above the stator adapter. A second example of the locomotive engine, optionally including the first example, further includes where the turbocharger bracket comprises a U-shaped member or a bridge-shaped member and where outlets of the first and second charge-air coolers are closer to the accessibility window than the turbocharger bracket. A third example of the locomotive engine, optionally including the first and/or second examples, further includes where the turbocharger system is closer to an upper portion of the cabin than each of the charge-air cooler system and stator adapter. A fourth example of the locomotive engine, optionally including one or more of the first through third examples, further includes where the first charge-air cooler comprises a first charge-air cooler inlet duct and where the second charge-air cooler comprises a second charge-air cooler inlet duct, and where a height of the first charge-air cooler inlet duct is less than a height of the second charge-air cooler inlet duct.

An embodiment of a locomotive engine system comprising a charge-air cooler system comprising a single charge-air cooler shaped to receive charge-air flows from a first compressor and a second compressor of a turbocharger system without mixing the charge-air flows, and where the single charge-air cooler comprises a first inlet duct fluidly coupling the first compressor to a first half of the single charge-air cooler and a second inlet duct fluidly coupling the second compressor to a second half of the single charge-air cooler, and where the first inlet duct is shaped differently than the second inlet duct due to a first compressor angle, measured relative to a first compressor horizontal axis and a general direction of charge-air flow through a first compressor outlet, being greater than a second compressor angle measured relative to a second compressor horizontal axis and a general direction of charge-air flow through a second compressor outlet, further comprising a first outlet duct configured to direct cooled charge-air from the first half to a first cylinder group of an engine and a second outlet duct configured to direct cooled charge-air from the second half to a second cylinder group of the engine. A first example of the locomotive engine further includes where the single charge-air cooler is arranged directly between the turbocharger system and an accessibility window of an alternator, and where the first outlet duct and the second outlet duct are equidistant from the accessibility window. A second example of the locomotive engine, optionally including the first example, further includes where the first cylinder group and the second cylinder group comprise equal numbers of cylinders, and where the engine is a V12 or V16 engine. A third example of the locomotive engine, optionally including the first and/or second examples, further includes where a maximum height of the first and second inlet ducts is less than 250 mm.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A locomotive engine system comprising:
   a turbocharger system configured to provide charge air to an engine, the turbocharger system comprising at least one compressor and one turbine;
   a charge-air cooler system comprising at least one charge-air cooler arranged below the at least one compressor;
   a turbocharger bracket arranged directly below the charge-air cooler system and shaped to mount the charge-air cooler and the turbocharger system to the engine; and
   a stator adapter physically coupling an alternator to the engine, and where the stator adapter comprises an accessibility window arranged below the charge-air cooler system, and where the at least one charge-air cooler is closer to the accessibility window than the turbocharger system.

2. The system of claim 1, wherein the at least one charge-air cooler is a first charge-air cooler, the charge-air cooler system further comprising a second charge-air cooler, the first charge-air cooler configured to provide cooled charge-air to a first cylinder group of the engine and the second charge-air cooler configured to provide cooled charge-air to a second cylinder group.

3. The system of claim 2, wherein the first charge-air cooler and the second charge-air cooler are respectively physically coupled to opposite sides of the turbocharger bracket.

4. The system of claim 2, wherein the first charge-air cooler is oriented at a first angle less than 80 degrees, and where the second charge-air cooler is oriented at a second angle less than the first angle, wherein the first angle is an angle measured between a central axis of the engine and a plane of the first charge-air cooler at its inlet, and where the second angle is an angle measured between the central axis of the engine and a plane of the second charge-air cooler at its inlet.

5. The system of claim 2, wherein the at least one compressor and one turbine are a first compressor and a first turbine, and wherein the turbocharger system further comprises a second compressor and a second turbine, the first compressor fluidly coupled to the first charge-air cooler and the second compressor fluidly coupled to the second charge-air cooler via a first charge-air cooler inlet and a second charge-air cooler inlet, respectively, and where the first compressor is lower than the second compressor relative to a support surface on which the engine sits.

6. The system of claim 5, wherein the first compressor is oriented at an angle between 50 to 60 degrees relative to a horizontal axis and a direction of charge-air flow through an outlet of the first compressor, and where the second compressor is oriented at an angle between 5 to 20 degrees relative to the horizontal axis and a direction of charge-air flow through an outlet of the second compressor, and where a first compressor outlet of the first compressor is closer to the accessibility window than a second compressor outlet of the second compressor, wherein the first compressor outlet is directly coupled to the first charge-air cooler inlet and the second compressor outlet is directly coupled to the second charge-air cooler inlet.

7. The system of claim 2, wherein the first charge-air cooler is identical to the second charge-air cooler in size and shape, and where the first charge-air cooler and the second charge-air cooler are equidistant from the accessibility window, and where the first charge-air cooler is closer to a cabin than the second charge air cooler, the cabin configured to house the engine.

8. The system of claim 1, wherein the at least one charge-air cooler is the only charge-air cooler, and where the at least one compressor and one turbine are a first compressor and a first turbine, and where the turbocharger system further comprises a second compressor and a second turbine, and where each of the first compressor and second compressor are fluidly coupled to the only charge-air cooler.

9. The system of claim 8, wherein the only charge-air cooler is partitioned to prevent mixing between charge-air from the first compressor and the second compressor within the only charge-air cooler.

10. The system of claim 8, wherein the first compressor is oriented at a first angle less than 80 degrees measured relative to a horizontal central axis of the first compressor and a general direction of charge-air flow through an outlet of the first compressor and where the second compressor is oriented at a second angle, less than the first angle, measured relative to a horizontal central axis of the second compressor and a general direction of charge-air flow through an outlet of the second compressor, and wherein a second compressor outlet is closer to the charge-air cooler than a first compressor outlet.

11. The system of claim 8, wherein the charge-air cooler comprises a first outlet duct and a second outlet duct, and where the first outlet duct is shaped to flow charge-air from the first compressor to a first cylinder group of the engine and where the second outlet duct is shaped to flow charge-air from the second compressor to a second cylinder group of the engine, and where the first and second outlet ducts are equidistant to the accessibility window.

12. A locomotive engine system comprising:
an engine having a first cylinder group and a second cylinder group comprising equal numbers of cylinders;
a turbocharger system comprising a first turbocharger and a second turbocharger, and where the first turbocharger comprises a first compressor and a first turbine in fluid communication with the first cylinder group, and where the second turbocharger comprises a second compressor and a second turbine in fluid communication with the second cylinder group, and where the first compressor and the second compressor are equidistant from a cabin configured to house the engine; and
a charge-air cooler system comprising a first charge-air cooler and a second charge-air cooler, where the first charge-air cooler is positioned to cool only charge-air from the first compressor and where the second charge-air cooler is positioned to cool only charge-air from the second compressor; wherein
the first charge-air cooler and the second charge-air cooler are equidistant from an accessibility window of a stator adapter shaped to mount an alternator to a side of the engine.

13. The engine system of claim 12, wherein the stator adapter is physically coupled to the engine prior to the alternator, and where the stator adapter further comprises a shimmed portion shaped to fit a turbocharger bracket mounting the charge-air cooler system and the turbocharger system to the side of the engine directly above the stator adapter.

14. The engine system of claim 13, wherein the turbocharger bracket comprises a U-shaped member or a bridge-shaped member and where outlets of the first and second charge-air coolers are closer to the accessibility window than the turbocharger bracket.

15. The engine system of claim 12, wherein the turbocharger system is closer to an upper portion of the cabin than each of the charge-air cooler system and stator adapter.

16. The engine system of claim 12, wherein the first charge-air cooler comprises a first charge-air cooler inlet duct and where the second charge-air cooler comprises a second charge-air cooler inlet duct, and where a height of the first charge-air cooler inlet duct is less than a height of the second charge-air cooler inlet duct.

17. A locomotive engine system comprising:
a charge-air cooler system comprising a single charge-air cooler shaped to receive charge-air flows from a first compressor and a second compressor of a turbocharger system without mixing the charge-air flows, and where the single charge-air cooler comprises a first inlet duct fluidly coupling the first compressor to a first half of the single charge-air cooler and a second inlet duct fluidly coupling the second compressor to a second half of the single charge-air cooler, and where the first inlet duct is shaped differently than the second inlet duct due to a first compressor angle, measured relative to a first compressor horizontal axis and a general direction of charge-air flow through a first compressor outlet, being greater than a second compressor angle measured relative to a second compressor horizontal axis and a general direction of charge-air flow through a second compressor outlet, further comprising a first outlet duct configured to direct cooled charge-air from the first half to a first cylinder group of an engine and a second outlet duct configured to direct cooled charge-air from the second half to a second cylinder group of the engine.

18. The system of claim 17, wherein the single charge-air cooler is arranged directly between the turbocharger system and an accessibility window of an alternator, and where the first outlet duct and the second outlet duct are equidistant from the accessibility window.

19. The system of claim 17, wherein the first cylinder group and the second cylinder group comprise equal numbers of cylinders, and where the engine is a V12 or V16 engine.

20. The system of claim 17, wherein a maximum height of the first and second inlet ducts is less than 250 mm.

* * * * *